United States Patent
Kobulnicky et al.

(10) Patent No.: US 11,861,566 B1
(45) Date of Patent: Jan. 2, 2024

(54) VEHICLE TELEMATICS SYSTEMS AND METHODS

(71) Applicant: State Farm Mutual Automobile Insurance Company, Bloomington, IL (US)

(72) Inventors: Ben Kobulnicky, Bloomington, IL (US); Matthew Floyd, Alpharetta, GA (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 78 days.

(21) Appl. No.: 15/915,883

(22) Filed: Mar. 8, 2018

Related U.S. Application Data

(60) Provisional application No. 62/564,689, filed on Sep. 28, 2017, provisional application No. 62/549,752, filed on Aug. 24, 2017.

(51) Int. Cl.
  *G06Q 10/20* (2023.01)
  *G07C 5/00* (2006.01)
  (Continued)

(52) U.S. Cl.
  CPC ............. *G06Q 10/20* (2013.01); *G06F 16/27* (2019.01); *G06Q 40/12* (2013.12); *G07C 5/008* (2013.01); *G07C 5/0808* (2013.01)

(58) Field of Classification Search
  CPC ........ G06Q 10/20; G06Q 40/12; G06F 16/27; G07C 5/0808; G07C 5/008
  See application file for complete search history.

(56) References Cited

U.S. PATENT DOCUMENTS

| | | |
|---|---|---|
| 5,750,887 A | 5/1998 | Schricker |
| 6,253,601 B1 | 7/2001 | Wang et al. |

(Continued)

FOREIGN PATENT DOCUMENTS

| | | | | |
|---|---|---|---|---|
| CA | 2967257 A1 | * | 11/2018 | ......... H04L 43/0876 |
| EP | 2075663 A1 | * | 7/2009 | ......... G05B 23/0283 |
| JP | 2018010379 A | * | 1/2018 | |

OTHER PUBLICATIONS

Lori Higdon, NPL—1—How to Forecast Vehicle Maintenance Using Telematics Data, Apr. 2016 (Year: 2016).*

(Continued)

*Primary Examiner* — Ariel J Yu
(74) *Attorney, Agent, or Firm* — Armstrong Teasdale LLP

(57) ABSTRACT

A computer system for automatically allocating periodic maintenance contributions to a maintenance savings account based upon vehicle telematics data includes a processor and a computer-readable storage medium having instructions stored thereon that, in response to execution by the processor, cause the processor to perform operations including: (i) receiving, from a vehicle, telematics data associated with a vehicle component; (ii) determining a replacement cycle associated with the vehicle component; (iii) determining a replacement cost of the vehicle component; (iv) calculating a plurality of periodic maintenance contributions to a maintenance savings account, the maintenance savings account associated with the vehicle owner and designated to receive the plurality of periodic maintenance contributions; and (v) automatically transferring the plurality of periodic maintenance contributions from a primary account associated with the user to the maintenance savings account.

10 Claims, 11 Drawing Sheets

(51) Int. Cl.
  *G06Q 40/12* (2023.01)
  *G07C 5/08* (2006.01)
  *G06F 16/27* (2019.01)

(56) References Cited

U.S. PATENT DOCUMENTS

| | | | |
|---|---|---|---|
| 6,609,051 B2 | 8/2003 | Fiechter et al. | |
| 6,711,474 B1 | 3/2004 | Treyz et al. | |
| 7,457,785 B1 | 11/2008 | Greitzer et al. | |
| 7,571,128 B1 | 8/2009 | Brown | |
| 7,945,359 B2 | 5/2011 | Watkins et al. | |
| 8,165,826 B2* | 4/2012 | Schimert | G05B 19/4065 |
| | | | 702/184 |
| 8,374,745 B2 | 2/2013 | Zhang et al. | |
| 9,286,736 B2* | 3/2016 | Punjabi | G06Q 30/016 |
| 9,311,271 B2 | 4/2016 | Wright | |
| 9,430,882 B2 | 8/2016 | Ho | |
| 9,633,487 B2 | 4/2017 | Wright | |
| 9,727,905 B2 | 8/2017 | Swinson et al. | |
| 10,192,369 B2 | 1/2019 | Wright | |
| 10,198,879 B2 | 2/2019 | Wright | |
| 10,217,068 B1* | 2/2019 | Davis | G07F 9/026 |
| 10,565,593 B1 | 2/2020 | Aabram et al. | |
| 10,692,056 B1* | 6/2020 | Garner, IV | G06Q 20/102 |
| 2004/0093931 A1 | 5/2004 | Carlstrom et al. | |
| 2009/0112393 A1* | 4/2009 | Maten | G01C 21/26 |
| | | | 701/29.5 |
| 2009/0254240 A1 | 10/2009 | Olsen et al. | |
| 2014/0021252 A1* | 1/2014 | Brennan | G06Q 20/405 |
| | | | 235/380 |
| 2014/0148972 A1 | 5/2014 | Basir et al. | |
| 2014/0229391 A1* | 8/2014 | East, III | G06Q 10/20 |
| | | | 705/305 |
| 2014/0257867 A1 | 9/2014 | Gay et al. | |
| 2014/0279707 A1 | 9/2014 | Joshua et al. | |
| 2014/0372221 A1 | 12/2014 | Momin et al. | |
| 2015/0081394 A1* | 3/2015 | Esposito | G06Q 30/04 |
| | | | 705/7.35 |
| 2015/0228129 A1 | 8/2015 | Cox et al. | |
| 2015/0379644 A1* | 12/2015 | Danielak | G06Q 20/108 |
| | | | 705/36 R |
| 2016/0035150 A1 | 2/2016 | Barfield, Jr. et al. | |
| 2016/0071082 A1 | 3/2016 | Driscoll et al. | |
| 2016/0098869 A1* | 4/2016 | Rood | G07C 5/0825 |
| | | | 701/32.7 |
| 2016/0104123 A1 | 4/2016 | Viswanath et al. | |
| 2016/0117928 A1 | 4/2016 | Hodges et al. | |
| 2016/0133066 A1* | 5/2016 | Lavie | G06Q 10/20 |
| | | | 701/31.4 |
| 2016/0133070 A1 | 5/2016 | Ikeda | |
| 2016/0321566 A1* | 11/2016 | Liu | G01C 21/3438 |
| 2016/0379310 A1* | 12/2016 | Madigan | G07C 5/0825 |
| | | | 705/4 |
| 2017/0054611 A1* | 2/2017 | Tiell | G06Q 30/0601 |
| 2018/0091596 A1 | 3/2018 | Alvarez et al. | |

OTHER PUBLICATIONS

Christian Brothers Automotive, NPL—2—Creating a Vehicle Maintenance Budget, Mar. 2017 (Year: 2017).*
Automotive Fleet, "Maintenance, Safety, and Compliance Aided by Telematics", Nov. 2016, 4 pps., http://www.automotive-fleet.com/channel/gps-telematics/article/story/2016/11/maintenance-safety-and-compliance-why-telematics-should-be-your-sidekick.aspx.
Rune Prytz, Machine learning methods for vehicle predictive maintenance using off-board and on-board data, Halmstad University Press, 2014, Halmstad University Dissertations No. 9.

* cited by examiner

VEHICLE TELEMATICS SYSTEMS AND METHODS

RELATED APPLICATIONS

This application claims priority to U.S. Provisional Patent Application No. 62/549,752, filed Aug. 24, 2017, entitled "VEHICLE TELEMATICS SYSTEMS AND METHODS," and U.S. Provisional Patent Application No. 62/564,689, filed Sep. 28, 2017, entitled "VEHICLE TELEMATICS SYSTEMS AND METHODS," the entire contents and disclosure of which are hereby incorporated by reference herein in their entirety.

FIELD OF THE INVENTION

The present disclosure relates to systems and methods for automatically allocating periodic maintenance contributions to a maintenance savings account based upon vehicle telematics data. More particularly, the present disclosure relates to systems and methods for determining a replacement cycle associated with a vehicle component and saving, incrementally and over the course of the replacement cycle, funds sufficient to cover the cost of replacing the vehicle component at the end of the replacement cycle.

BACKGROUND

Modern automobiles may be equipped with electronic devices that are capable of generating vehicle telematics data. For example, vehicle telematics data may be collected by vehicle mounted navigation systems (e.g., GPS receivers), integrated hands-free mobile communications systems, wireless safety and automatic driving assistance systems, and the like. Common practical applications of vehicle telematics data include vehicle tracking, tow package tracking (e.g., trailer tracking, container tracking, etc.), management and coordination of fleet vehicles, satellite navigation, various mobile communications functions, wireless vehicle safety communications, communications with emergency services systems, and the like.

Vehicle telematics data has not traditionally been utilized to forecast vehicle maintenance requirements. Rather, at present, a user (e.g., a vehicle owner/operator) may depend upon a predetermined maintenance schedule (such as a maintenance schedule printed in a vehicle owner's manual) for scheduling maintenance activities. In other cases, a user may be alerted to a maintenance requirement in a vehicle by observable degradation and/or failure of a particular component. Similarly, in many instances, such as, for example, in the case of a vehicle's tires, a user may visually inspect a vehicle component to determine whether, and when, the component may require maintenance and/or replacement.

In addition to the drawbacks associated with maintenance managed by, and initiated at the discretion of, a user, the approaches to vehicle maintenance described above may not adequately prepare a user for the cost of repairing or replacing a worn or damage vehicle component. Specifically, many vehicle components (e.g., tires) may cost hundreds of dollars to replace. Many users may encounter such costs unexpectedly, but even if a maintenance cost is anticipated, it is not uncommon that the expense is a financial hardship. Conventional techniques may include additional drawbacks as well.

BRIEF SUMMARY

The present embodiments relate to systems and methods for automatically allocating periodic maintenance contributions to a maintenance savings account based upon vehicle telematics data. The present embodiments may also determine a replacement cycle associated with a vehicle component and saving, incrementally and over the course of the replacement cycle, funds sufficient to cover the cost of replacing the vehicle component at the end of the replacement cycle.

In one aspect, a computer system for automatically allocating periodic maintenance contributions to a maintenance savings account based upon vehicle telematics data may be provided. In some exemplary embodiments, the system may include a processor and a non-transitory, tangible, computer-readable storage medium having instructions stored thereon that, in response to execution by the processor, cause the processor to perform operations including: (i) receiving, from a vehicle, telematics data associated with at least one vehicle component; (ii) determining, based upon the telematics data, a replacement cycle associated with the at least one vehicle component; (iii) determining a replacement cost of the at least one vehicle component; (iv) calculating, based upon the replacement cycle and the replacement cost, a plurality of periodic maintenance contributions to a maintenance savings account, the maintenance savings account associated with the vehicle owner and designated to receive the plurality of periodic maintenance contributions; and/or (v) automatically transferring the plurality of periodic maintenance contributions from a primary account associated with the user to the maintenance savings account, each periodic maintenance contribution of the plurality of periodic maintenance contributions transferred to the maintenance savings account on a periodic basis over a period of time associated with the replacement cycle. The system may include additional, less, or alternate functionality, including that discussed elsewhere herein.

In another aspect, a computer system for automatically allocating periodic maintenance contributions to a maintenance savings account based upon vehicle telematics data may be provided. In some exemplary embodiments, the system may include a processor and a non-transitory, tangible, computer-readable storage medium having instructions stored thereon that, in response to execution by the processor, cause the processor to perform operations including: (i) receiving, from a vehicle, telematics data associated with at least one vehicle component; (ii) determining, based upon the telematics data, a plurality of trip costs associated with the at least one vehicle component, each of the plurality of trip costs representative of a cost associated with wear of the at least one vehicle component as a result of a particular vehicle trip; (iii) aggregating the plurality of trip costs; (iv) determining that the aggregated plurality of trip costs exceeds a maintenance contribution threshold; and/or (v) automatically transferring, in response and from a primary account associated with a user of the vehicle, a maintenance contribution payment to a maintenance savings account, the maintenance savings account designated to hold funds for replacing the at least one vehicle component at an end of a replacement cycle associated with the at least one vehicle component. The system may include additional, less, or alternate functionality, including that discussed elsewhere herein.

In another aspect, a computer system for automatically allocating periodic maintenance contributions to a maintenance savings account based upon vehicle telematics data may be provided. In some exemplary embodiments, the system may include a processor and a non-transitory, tangible, computer-readable storage medium having instructions stored thereon that, in response to execution by the processor, cause the processor to perform operations including: (i) receiving, from a vehicle and at a first time, telematics data associated with at least one vehicle component; (ii) analyzing the telematics data to determine an initial replacement cycle associated with the at least one vehicle component, the initial replacement cycle representative of an estimated lifecycle of the at least one vehicle component; (iii) receiving, from the vehicle and at a second time, updated telematics data associated with the at least one vehicle component; and/or (iv) analyzing the updated telematics data to determine an updated replacement cycle associated with the at least one vehicle component, the updated replacement cycle representative of an updated estimate of the lifecycle of the at least one vehicle component. The system may include additional, less, or alternate functionality, including that discussed elsewhere herein.

In another aspect, a computer system for automatically allocating periodic maintenance contributions to a maintenance savings account based upon vehicle telematics data may be provided. In some exemplary embodiments, the system may include a processor and a non-transitory, tangible, computer-readable storage medium having instructions stored thereon that, in response to execution by the processor, cause the processor to perform operations including: (i) receiving, from a vehicle, telematics data associated with a first user of the vehicle; (ii) receiving, from the vehicle, telematics data associated with a second user of the vehicle; (iii) determining, based upon the telematics data associated with the first user, an amount of wear on at least one vehicle component attributable to the first user; (iv) determining, based upon the telematics data associated with the second user, an amount of wear on the at least one vehicle component attributable to the second user; (v) calculating, based upon the amount of wear attributable to the first user, a first plurality of periodic maintenance contributions to a maintenance savings account; (vi) calculating, based upon the amount of wear attributable to the second user, a second plurality of periodic maintenance contributions to the maintenance savings account; (vii) automatically transferring the first plurality of periodic maintenance contributions from a primary account associated with the first user to the maintenance savings account; and/or (viii) automatically transferring the second plurality of periodic maintenance contributions from a primary account associated with the second user to the maintenance savings account. The system may include additional, less, or alternate functionality, including that discussed elsewhere herein.

In another aspect, a computer-implemented method for automatically allocating periodic maintenance contributions to a maintenance savings account based upon vehicle telematics data may be provided. The method may include: (i) receiving, from a vehicle, telematics data associated with at least one vehicle component; (ii) determining, based upon the telematics data, a replacement cycle associated with the at least one vehicle component; (iii) determining a replacement cost of the at least one vehicle component; (iv) calculating, based upon the replacement cycle and the replacement cost, a plurality of periodic maintenance contributions to a maintenance savings account, the maintenance savings account associated with the vehicle owner and designated to receive the plurality of periodic maintenance contributions; and/or (v) automatically transferring the plurality of periodic maintenance contributions from a primary account associated with the user to the maintenance savings account, each periodic maintenance contribution of the plurality of periodic maintenance contributions transferred to the maintenance savings account on a periodic basis over a period of time associated with the replacement cycle. The method may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
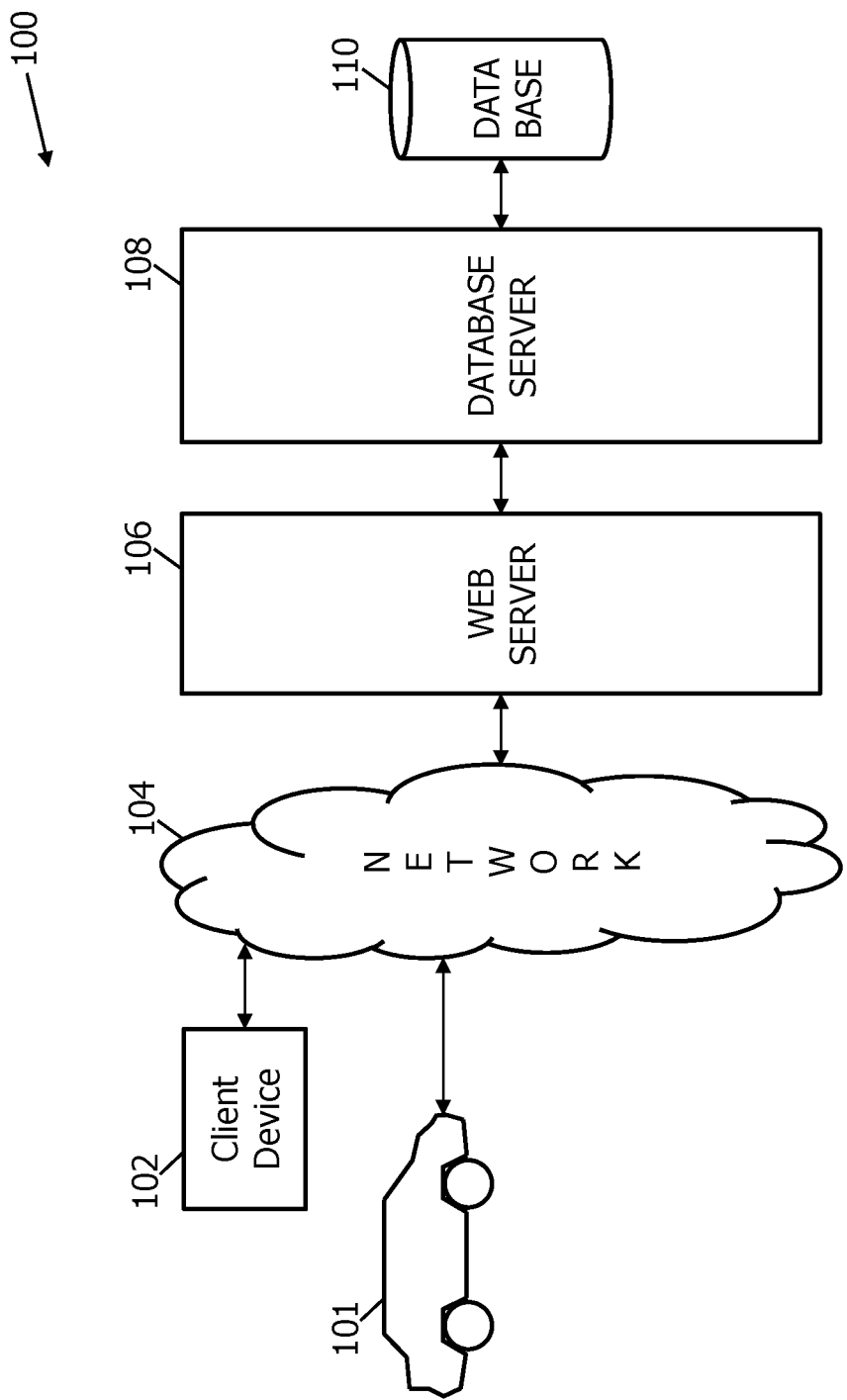
FIG. 1 illustrates a schematic diagram of an exemplary computer system for automatically allocating periodic maintenance contributions to a maintenance savings account based upon vehicle telematics data, in accordance with various embodiments of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for automatically allocating periodic maintenance contributions to a maintenance savings account based upon vehicle telematics data. In one exemplary embodiment, the process may be performed by at least one front-end system, such as a client device, and at least one back-end system, such as a web server and/or a database server.

Accordingly, in the exemplary embodiment, a computer system for automatically allocating periodic maintenance contributions to a maintenance savings account based upon vehicle telematics data may receive telematics data from a vehicle. More particularly, the system may receive vehicle telematics data associated with one or more vehicle components.

As used herein, a "vehicle component" may be any component or part of a vehicle, such as, for example, and without limitation, one or more vehicle tires, a vehicle oil filter and/or a vehicle lubricant, such as vehicle motor oil, vehicle fluids, electronic vehicle components, vehicle brake pads, transmission, clutch, drivetrain, sensors (such as smart vehicle sensors or autonomous vehicle sensors), and the like. In addition, as used herein, "vehicle telematics data" is any data associated with a vehicle component, such as a tread depth of one or more vehicle tires, an environmental sensor reading, vehicle mileage, vehicle oil and fluid levels, tire pressure, tire temperature, vehicle brake pad thicknesses, and the like. Additionally or alternatively, vehicle telematics data may include data captured by a vehicle component, such as environmental data (e.g., temperature, humidity) or contextual data (e.g., location, acceleration).

In some embodiments, vehicle telematics data may be collected by one or more sensors mounted on or installed within a vehicle. Such sensors may be configured to monitor a vehicle component and may provide vehicle telematics data collected in conjunction with a particular vehicle component to the system. In certain embodiments, the sensors may be configured to monitor environmental factors, such as temperature, humidity, acceleration, and the like. Thus, the system receives vehicle telematics data associated with at least one vehicle component and/or environmental factor.

In the exemplary embodiment, the system may analyze the received vehicle telematics data to determine a replacement cycle associated with one or more vehicle components.

As used herein, a "replacement cycle" may include a time remaining until a vehicle component should be replaced or scheduled for maintenance.

In certain embodiments, the system may be further configured to retrieve industry data associated with the vehicle telematics data. Industry data may include life expectancy data, replacement cycle data, vehicle component cost data (e.g., repair costs, replacement costs), vehicle labor rates, and the like. For example, industry data may include a life expectancy associated with a vehicle component, a replacement cost for the vehicle component, and an estimated labor cost for the component replacement. In one embodiment, the system includes a database storing industry data (e.g., database 110). Additionally or alternatively, the system may be configured to query an industry data source, such as a data source associated with a vehicle manufacturer or vehicle component manufacturer. For example, the system may transmit a query including a vehicle and/or part identifier to an industry data source to retrieve industry data.

Accordingly, in some embodiments, the computer system may analyze vehicle telematics data received in association with a vehicle component to determine a rate of wear on the vehicle component, and the rate of wear may (as described herein) be used to determine a replacement cycle. In addition, the system may retrieve life expectancy (or lifecycle) data associated with the vehicle component, which the system may analyze in conjunction with the calculated rate of wear to determine a replacement cycle. Further, as used herein, "lifecycle data" may include any data associated with a vehicle component that indicates an amount of wear and/or use that the component may suitably receive prior to replacement or maintenance of the component. For example, in the case of tires, lifecycle data may include a mileage, a tread depth, tire temperature, tire pressure, and/or any other data indicative of the life expectancy (prior to replacement) of the tires.

The computer system may, based upon the received vehicle telematics data (e.g., a determined rate of wear) and/or retrieved lifecycle data, determine a replacement cycle. Specifically, in some embodiments, the system may mathematically divide lifecycle data by a determined rate of wear. For example, in the case of vehicle tires, lifecycle data may indicate that the tires have a life expectancy of 45,000 miles. The system may divide the life expectancy of 45,000 miles (minus any mileage already placed on the tires) by an average mileage (received by the system as telematics data and/or calculated by the system based upon received telematics data) to determine a time remaining until replacement of the tires. Thus, in the case of a new set of tires (having little or no wear) and an average daily mileage of 50 miles/day, a replacement cycle (e.g., a time remaining until replacement) may be approximately 900 days (e.g., 45,000/50). In certain embodiments, the computer system determines the replacement cycle based at least in part on the retrieved industry data. For example, the computer system may be configured to compare the industry data to the determined rate of wear.

In the exemplary embodiment, the computer system may also determine a replacement cost and/or a maintenance cost of one or more vehicle components. For example, in some embodiments, the system may retrieve a replacement cost and/or a maintenance cost associated with one or more components from a database. As used herein, a "replacement cost" may include any cost associated with replacing a worn or damaged vehicle component. Similarly, as used herein, a "maintenance cost" may include any cost associated with maintenance performed on a worn or damaged vehicle component.

The computer system may, in addition, calculate a plurality of periodic maintenance contributions to a maintenance savings account. As used herein, a "periodic maintenance contribution" may include any periodic and/or recurring payment from one account (e.g., a "primary account") to another account (e.g., a "periodic maintenance account"), where a primary account may be any bank account from which funds may be transferred, and a periodic maintenance savings account may be any account designated to receive funds from the primary account, such as, for example, one or more periodic maintenance contributions.

Accordingly, to calculate a periodic maintenance contribution, the computer system may subtract a current maintenance account balance from a total replacement cost and/or a total maintenance cost of a vehicle component. The computer system may, in addition, divide the resulting mathematical difference by a replacement cycle (as described above). For example, the system may determine that a maintenance account includes a current balance of $200 as well as that a total cost of tire replacement is $500. The system may subtract $200 from $500 to determine that a maintenance savings account associated with a vehicle or vehicle component (e.g., the tires) is $300 short of the balance required to replace the tires on the vehicle. The system may, in addition, divide the balance required (e.g., $300) by the replacement cycle (e.g., in the example above, 900 days) to calculate a periodic (e.g., daily) maintenance contribution, such as, for example $0.33/day.

Thus, the computer system may divide a replacement cycle into a plurality of replacement intervals, and each replacement interval may be associated with a periodic maintenance contribution. For instance, in the example above, a replacement cycle may be divided into a plurality of daily replacement intervals, each associated with a periodic (e.g., daily) maintenance contribution. The system may, in addition, divide a total (or remaining) replacement cost by a total number of (remaining) replacement intervals to obtain an amount associated with each of the plurality of periodic maintenance contributions. In other words, and in brief, the system may determine a periodic maintenance contribution based upon a total cost of replacing a vehicle component (less an existing or current maintenance account balance), and the resulting mathematical difference may be divided by a replacement cycle and/or a number of replacement intervals subdivided from the total replacement cycle. In addition, and in the exemplary embodiment, the system may automatically transfer one or more periodic maintenance contributions from a primary account to a periodic maintenance savings account.

In various embodiments, the computer system may also provide an interface (e.g., a "dashboard") from which a user may select one or more vehicle components for periodic maintenance contributions. The dashboard may be provided as a web-based interface, such as a smartphone "app" and/or as a webpage provided to any suitable computing device, such as a client device. Thus, in some embodiments, a user may select vehicle components to which the user would like the system to allocate periodic maintenance contributions. Each vehicle component may be monitored independently by the system, and a maintenance savings account may be organized or partitioned to track periodic maintenance contributions on a component-by-component basis. In other embodiments, each vehicle component may be associated with a unique maintenance savings account to ensure that funds allocated to a particular vehicle component are maintained in a dedicated maintenance savings account.

In addition, in some embodiments, the computer system may determine, based upon updated vehicle telematics data, an updated replacement cycle associated with one or more vehicle components. For example, the computer system may periodically (e.g., daily) receive updated telematics data from a vehicle. In response, the system may determine, based upon the updated telematics data, one or more updated replacement cycles associated with one or more vehicle components. Thus, in some embodiments, the computer system is capable of dynamically adjusting a replacement cycle (and thus a periodic maintenance contribution) based upon, for example, real-time (or near real-time) vehicle telematics data.

Moreover, in various embodiments, the computer system may also determine one or more maintenance contributions based upon one or more trip costs associated with a vehicle. As used herein, a "trip cost" is a cost associated with a particular "trip" or use of a vehicle. For example, the computer system may analyze vehicle telematics data to determine one or more trip costs associated with one or more vehicle components. Such trip costs may be based upon, for instance, wear on a vehicle component as a result of a particular trip or use of a vehicle. To calculate a trip cost, the computer system may divide a life expectancy of a vehicle component by a value (derived or obtained directly from vehicle telematics data) indicating an amount of life expectancy used or consumed during a particular trip. The ratio obtained as a result of the division may be multiplied by the total replacement cost of the vehicle component to determine the trip cost associated with a trip.

The computer system may, in addition, aggregate a plurality of trip costs to obtain an aggregated trip cost. The aggregated trip cost may be compared to a maintenance contribution threshold (which may be selected by a user and/or preselected by the system), and if the aggregated trip cost exceeds the maintenance contribution threshold, the system may automatically transfer a periodic maintenance contribution (such as a periodic maintenance contribution totaling the aggregated trip cost) from a primary account to a maintenance savings account.

In some embodiments, the computer system may be configured to allocate periodic maintenance contributions based upon a particular user (e.g., driver or non-driver passenger) of a vehicle. For example, the computer system may identify a first user of the vehicle and a second user of the vehicle. To identify one or more users of the vehicle, the system may analyze received vehicle telematics data, which may include data sufficient to determine which of the users was driving the vehicle when the telematics data was generated. In other words, the received vehicle telematics data may specify a user associated with a particular driver or other user of the vehicle.

As used herein, user refers to a party associated with the vehicle, such as owners, drivers, and/or passengers. For example, users of the computer system may include a lessor (e.g., owner) of a vehicle, and a leasee (e.g., driver) of a vehicle. In another example, the users of the computer system may include any number of drivers.

In some embodiments, the computer system may, in addition, allocate a first plurality of maintenance contributions (or an individual maintenance contribution) to a first maintenance savings account associated with the first user based upon the vehicle telematics data. Similarly, the computer system may allocate a second plurality of maintenance contributions (or an individual maintenance contribution) to a second maintenance savings account associated with the second user based upon the vehicle telematics data. The maintenance contributions allocated to the first and second maintenance savings accounts may thus reflect actual usage of a vehicle by a plurality of users, such that each user is only responsible for deposits to a maintenance savings account as a result of that user's actual use of the vehicle. When a vehicle component is due for replacement (or maintenance) the funds allocated to each of the plurality of maintenance savings accounts may be aggregated, by the system, to equal the total replacement (or maintenance) cost of the vehicle component.

In other embodiments, the computer system is configured to allocate the first plurality of maintenance contributions (or an individual maintenance contribution) to a first maintenance savings account associated with the first user based upon the vehicle telematics data and to further allocate a second plurality of maintenance contributions associated with the second user to the first maintenance savings account based upon the vehicle telematics data. Similarly, when a vehicle component is due for replacement, the cost may be covered by the contributions included in the first maintenance savings account. In one embodiment, the computer system allocates contributions from the second user to the first user, such that the second user compensates the first user based on their usage. In yet other embodiments, the computer system may be configured to allocate any combination of contributions to the first account, and may be further configured to maintain a record of contributions based on associated user. For example, the computer system may determine an individual user's contribution to a shared account.

In some embodiments, the computer system may store one or more groups of telematics data obtained over a period of time, such as daily groups of telematics data, in a plurality of blocks of a blockchain. As used herein, a "blockchain" is a distributed database that maintains a continuously-growing list of ordered records, known as blocks. Each block may contain at least a timestamp and a link to the previous block in the chain. The link to the previous block may be a hash of the previous block. For vehicle telematics data, the first block may contain vehicle telematics data received during a particular period of time, such as over the course of a particular day. The second block may contain an updated or later vehicle telematics data, such as vehicle telematics data received during a subsequent period of time, such as over the course of a subsequent day. The second block may contain a hashed copy of the first block as well. This blocking of vehicle telematics data may continue to any number of blocks, with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining Exemplary technical effects of the systems and methods described herein may include, for example: (a) receiving and processing vehicle telematics data to determine a replacement cycle associated with a vehicle component with respect to which vehicle telematics data is collected; (b) determining, based upon the replacement cycle and a replacement cost of a vehicle component, a plurality of maintenance contributions to be transferred from a primary bank account of a user to a maintenance savings account of the user that is designated to receive the plurality of maintenance contributions, where the plurality of maintenance contributions are incrementally allocated to the maintenance savings account, such that a user of a vehicle is not financially burdened by the allocation, over the duration of the replacement cycle, of a plurality of periodically recurring maintenance contributions; (c) automatically transferring the plurality of maintenance contributions to the maintenance savings account, such as, for example, at the close of a replacement interval (e.g., daily, weekly, monthly, etc.) and/or in response to a determination that an aggregated total of maintenance contributions exceeds a threshold value; (d) breaking vehicle usage out by user, such as, for example, where the vehicle is shared between a plurality of users, such that maintenance contributions are allocated to one or more maintenance savings accounts based upon user contributions to overall vehicle component wear and tear; and (e) determining a plurality of "trip costs" associated with one or more trips or uses of a vehicle, and allocating maintenance contributions to one or more maintenance savings accounts based upon one or more trip costs, one or more aggregated trip costs, and the like.

Exemplary Computer System for Automatically Allocating Periodic Maintenance Contributions FIG. 1 is a schematic view of an exemplary computer system 100 for automatically allocating periodic maintenance contributions to a maintenance savings account based upon vehicle telematics data. In one exemplary embodiment, system 100 may include a client device, such as a client device 102. Client device 102 may be associated with an individual, such as a user of a vehicle 101. System 100 may also include network 104, a web server 106, a database server 108, and/or a database 110.

Accordingly, in the exemplary embodiment, vehicle 101 may include one or more computer systems configured to collect and/or generate vehicle telematics data. For example, vehicle 101 may include a plurality of sensors configured to monitor one or more vehicle components. Vehicle telematics data may be generated based upon data collected by the one or more sensors and analyzed, as described herein, to determine maintenance requirements associated with one or more monitored vehicle components. In certain embodiments, vehicle telematics data may also include environmental data generated by any number of sensors measuring environmental factors impacting the vehicle such as temperature and humidity.

In the exemplary, client device 102 may be any personal computing device and/or any mobile communications device of a user, such as a personal computer, a tablet computer, a smartphone, wearable, mobile device, and the like. Client device 102 may be configured to present an application (e.g., a smartphone "app") or a webpage, such as webpage or an app for selecting vehicle components for maintenance contributions. To this end, client device 102 may include or execute software, such as a web browser, for viewing and interacting with a webpage and/or an app.

Network 104 may be any electronic communications system, such as any computer network or collection of computer networks, and may incorporate various hardware and/or software. Communication over network 104 may be accomplished via any suitable communication channels, such as, for example, one or more telephone networks, one or more extranets, one or more intranets, the Internet, one or more point of interaction devices (e.g., point of sale devices, smart phones, cellular phones, or other mobile devices), various online and/or offline communications systems, such as various local area and wide area networks, and the like.

Web server 106 may be any computer or computer system that is configured to receive and process requests made via HTTP. Web server 106 may be coupled between client device 102 and database server 108. More particularly, web server 106 may be communicatively coupled to client device 102 via network 104. In various embodiments, web server 106 may be directly coupled to database server 108 and/or communicatively coupled to database server 108 via a network, such as network 104. Web server 106 may, in addition, function to store, process, and/or deliver one or more web pages and/or any other suitable content to client device 102. Web server 106 may, in addition, receive data, such as data provided to the app and/or webpage (as described herein) from client device 102 for subsequent transmission to database server 108.

In various embodiments, web server 106 may implement various hardware and/or software, such as, for example, one or more communication protocols, one or more message brokers, one or more data processing engines, one or more servlets, one or more application servers, and the like. For instance, in one embodiment, web server 106 may implement an Internet of Things (IoT) protocol, such as a machine-to-machine IoT communications protocol (e.g. an MQTT protocol). In addition, in various embodiments, web server 106 may implement a message broker program module configured to translate a message or communications from a messaging protocol of a sending device to a messaging protocol of a receiving device (e.g., RABBITMQ, KAFKA, ACTIVEMQ, KESTREL). Further still, in some embodiments, web server 106 may implement a data processing engine, such as a cluster computing framework like APACHE SPARK. In addition, in various embodiments, web server 106 may implement servlet and/or JSP server, such as APACHE TOMCAT.

Database server 108 may be any computer or computer program that provides database services to one or more other computers or computer programs. In various embodiments, database server 108 may be communicatively coupled between web server 108 and database 110. Database server 108 may, in addition, function to process data received from web server 106, such as authentication data, which may include, for example, a first authentication factor and/or a second authentication factor.

Database 110 may be any organized collection of data, such as, for example, any data organized as part of a relational data structure, any data organized as part of a flat file, and the like. Database 110 may be communicatively coupled to database server 108 and may receive data from, and provide data to, database server 108, such as in response to one or more requests for data, which may be provided via a database management system (DBMS) implemented on database server 108. In various embodiments, database 110 may be a non-relational database, such as an APACHE HADOOP database.

Although the components of computer system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although a single web server 106, a single database server 108, and a single database 110 are described above, it will be appreciated that system 100 may include any suitable number of interconnected, communicatively coupled, web servers, database servers, and/or databases. Further, although certain functions, processes, and operations are described herein with respect to one or more system components, it is contemplated that one or more other system components may perform the functions, processes, and operations described herein.

Exemplary Client Device

Figure 2:
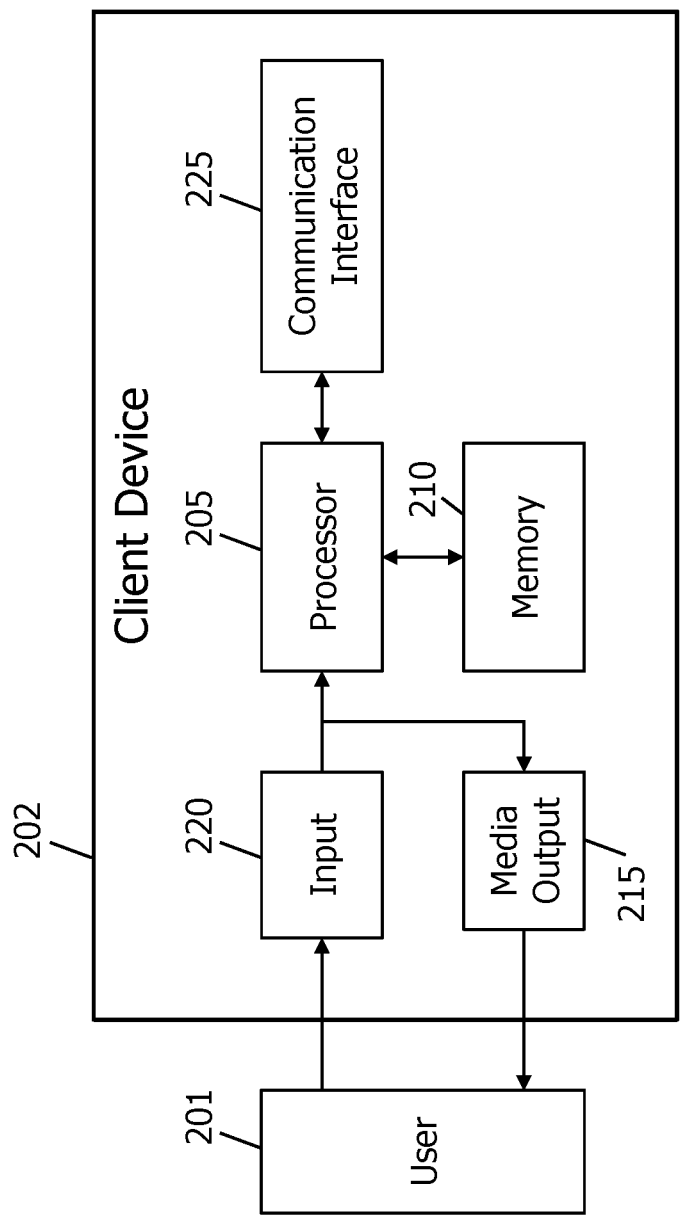
FIG. 2 illustrates an exemplary configuration of a client device shown in FIG. 1, in accordance with various embodiments of the present disclosure.

FIG. 2 depicts an exemplary configuration of a client device 202, such as client device 102, as shown in FIG. 1, and in accordance with one embodiment of the present disclosure. Client device 202 may be operated by a user 201. Client device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client device 202 may also include a communication interface 225, communicatively coupled via network 104 to web server 106 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website.

Exemplary Database System

Figure 3:
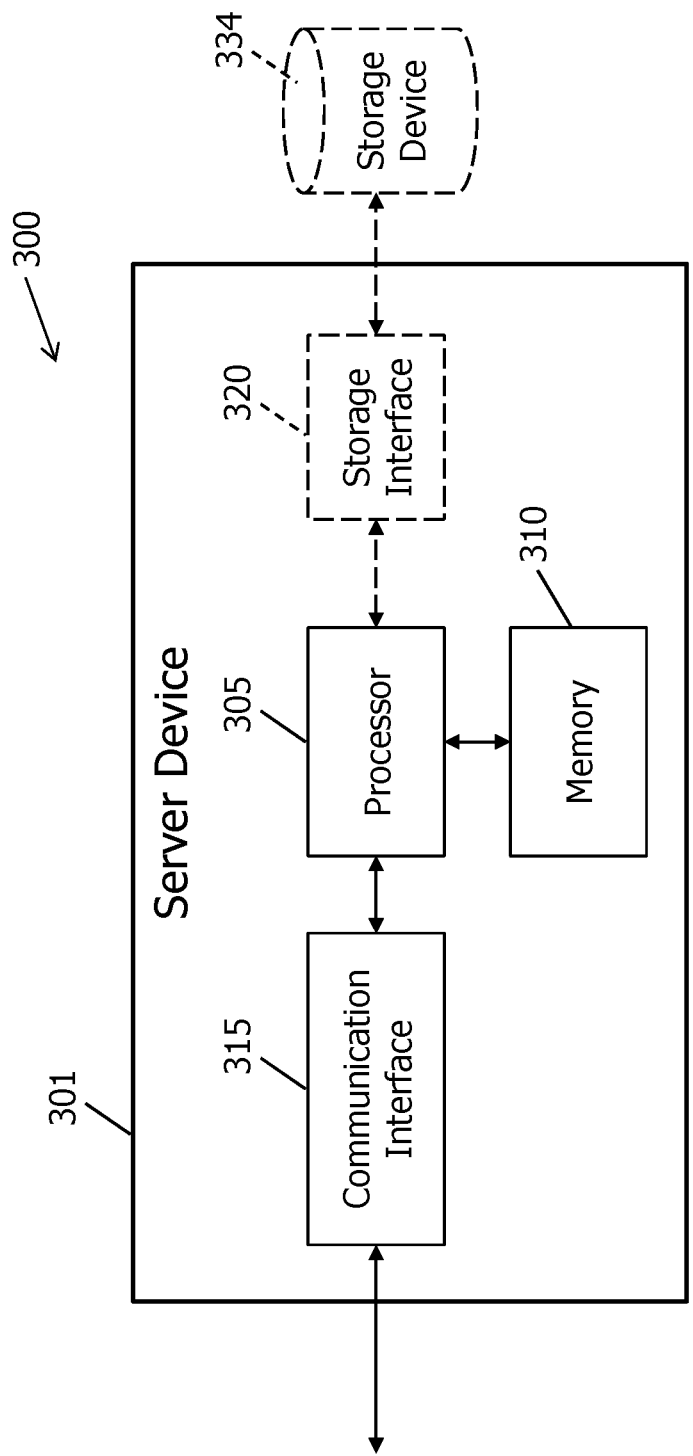
FIG. 3 illustrates an exemplary configuration of a server shown in FIG. 1, in accordance with various embodiments of the present disclosure.

FIG. 3 depicts an exemplary database system 300 such as database server 108 and database 110, as shown in FIG. 1, and in accordance with one exemplary embodiment of the present disclosure. Accordingly, database system 300 may include a server computer device 301 (e.g., database server 108), which may, in turn, include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client device 202 via the Internet and/or over a computer network.

Processor 305 may also be operatively coupled to a storage device 334 (e.g., database 116). Storage device 334 may be any computer-operated hardware suitable for storing and/or retrieving data, such as, but not limited to, data associated with database 320. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Exemplary Processes for Automatically Allocating Periodic Maintenance Contributions FIGS. 4-9 describe processes for automatically allocating periodic maintenance contributions to a maintenance savings account based upon vehicle telematics data. Although each of the processes described below may be implemented independently, it will be understood that the steps included in each of the processes described below may be variously interchanged and/or combined as desired.

Figure 4:
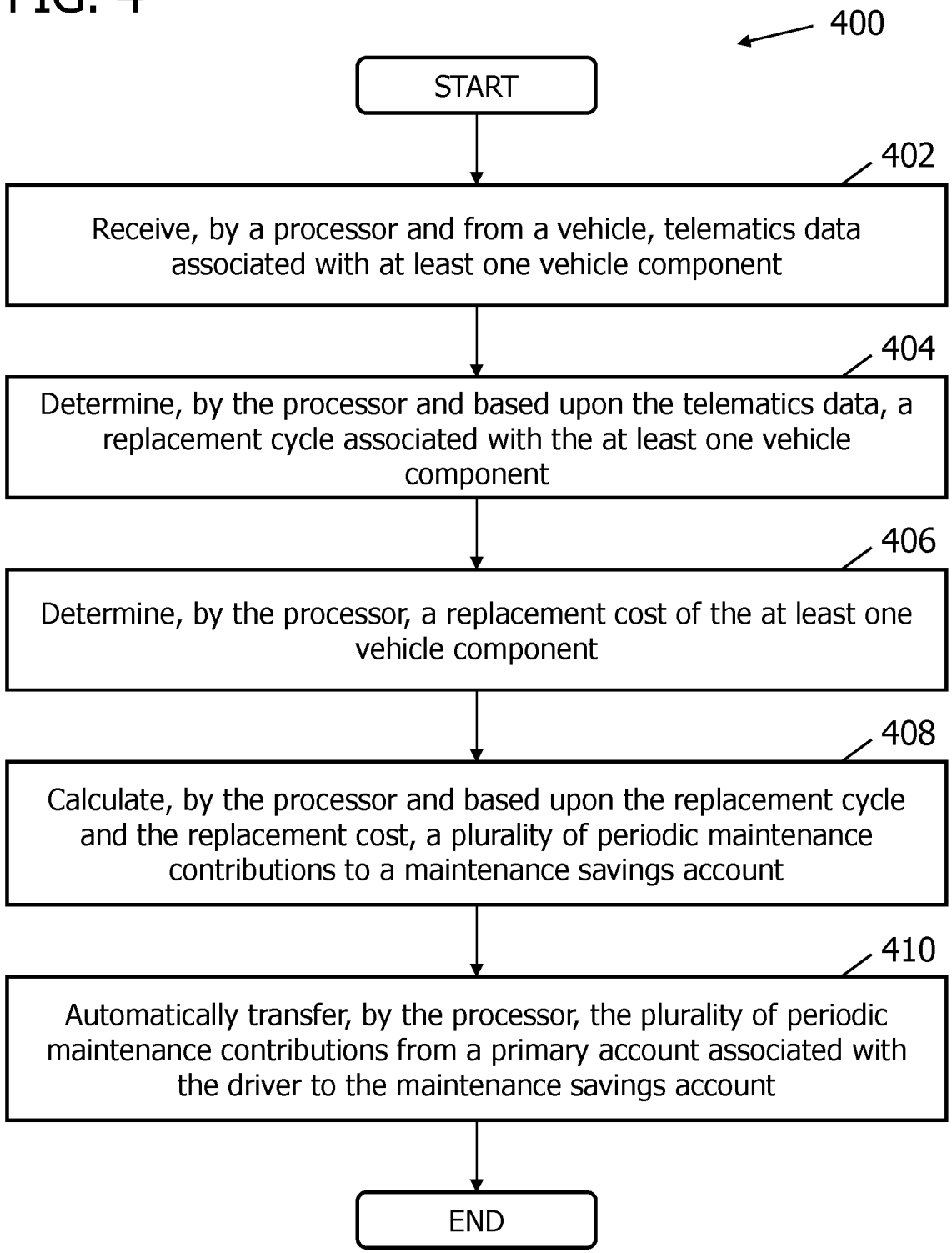
FIG. 4 is a flowchart illustrating an exemplary process for automatically allocating periodic maintenance contributions to a maintenance savings account based upon vehicle telematics data, as implemented by the system shown at FIG. 1, and in accordance with various embodiments of the present disclosure.
Figure 5:
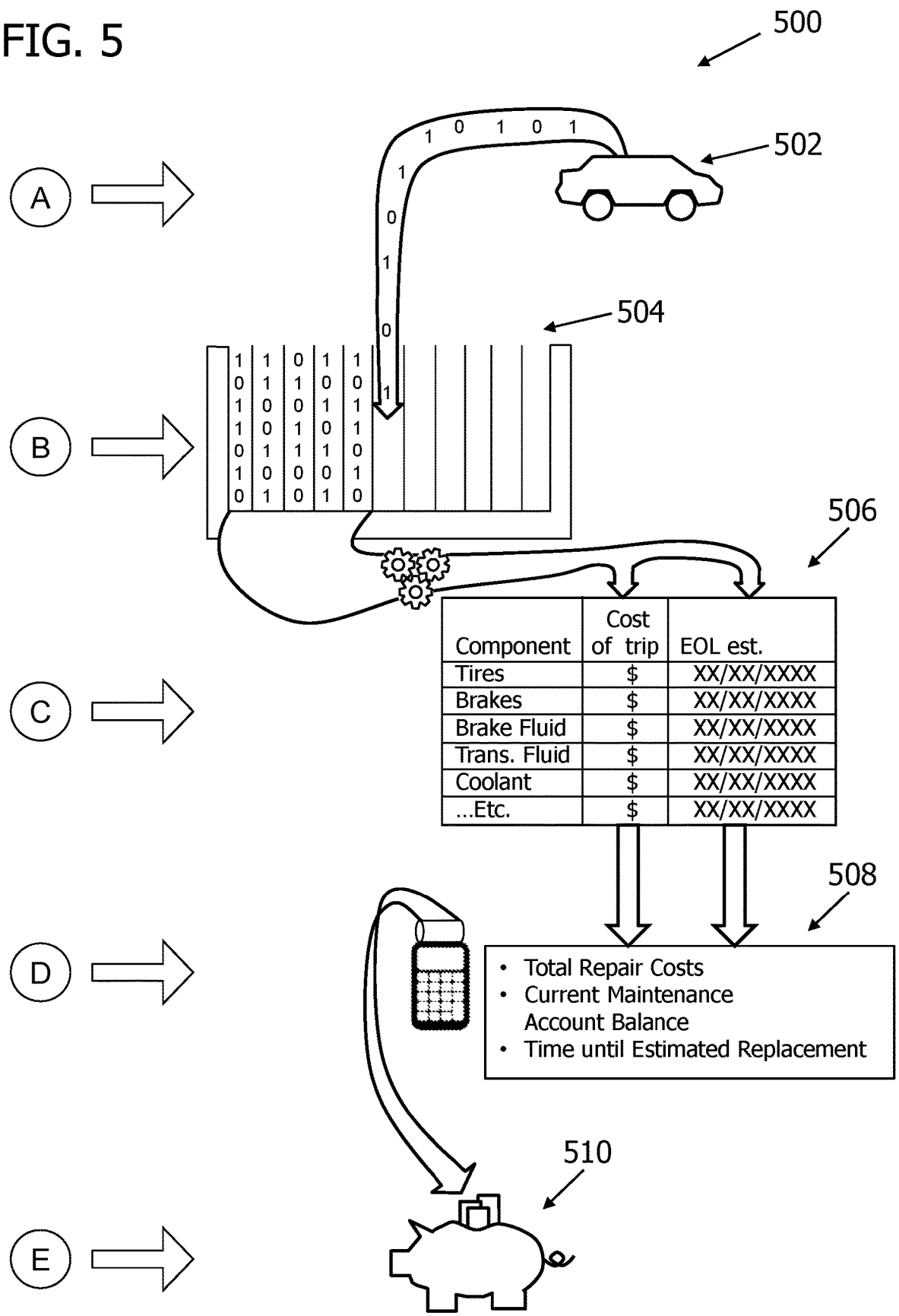
FIG. 5 is a schematic diagram illustrating an exemplary process for automatically allocating periodic maintenance contributions to a maintenance savings account based upon vehicle telematics data, as implemented by the system shown at FIG. 1, and in accordance with various embodiments of the present disclosure.

FIG. 4 is a flowchart illustrating an exemplary computer-implemented process 400 for automatically allocating periodic maintenance contributions to a maintenance savings account based upon vehicle telematics data, as implemented by computer system 100 (shown at FIG. 1). FIG. 5 is a schematic diagram illustrating process 400. Accordingly, with combined reference to FIG. 4 and FIG. 5, in the exemplary embodiment, system 100 (e.g., web server 106 and/or database server 108), may receive telematics data from vehicle 101 (step 402). More particularly, system 100 may receive vehicle telematics data associated with one or more vehicle components.

As described above, a vehicle component may be any component or part of a vehicle, such as, for example, and without limitation, one or more vehicle tires, an environmental sensor or other sensor, a vehicle oil filter and/or a vehicle lubricant, such as vehicle motor oil, vehicle fluids, electronic vehicle components, vehicle brake pads, transmissions, clutches, drivetrains, and the like. In addition, as described above, vehicle telematics data is any data associated with a vehicle component, such as a tread depth of one or more vehicle tires, vehicle mileage, vehicle oil and fluid levels, vehicle brake pad thicknesses, and the like. Additionally or alternatively, vehicle telematics data may include environmental data such as humidity and temperature.

In some embodiments, vehicle telematics data may be collected by one or more sensors mounted on or installed within vehicle 101. Such sensors may be configured to monitor an associated vehicle component and may provide vehicle telematics data collected in conjunction with a particular vehicle component to computer system 100. Thus, computer system 100 receives vehicle telematics data associated with at least one vehicle component.

In the exemplary embodiment, computer system 100 may analyze the received vehicle telematics data to determine a replacement cycle associated with one or more vehicle components (step 404). As described above, a "replacement cycle" may include a time remaining until a vehicle component should be replaced or scheduled for maintenance.

Accordingly, in some embodiments, computer system 100 may analyze telematics data received in association with a vehicle component to determine a rate of wear on the vehicle component, and the rate of wear may (as described herein) be used to determine a replacement cycle. In addition, computer system 100 may retrieve life expectancy (or lifecycle) data associated with the vehicle component, which computer system 100 may analyze in conjunction with the calculated rate of wear to determine a replacement cycle. In various embodiments, lifecycle data may be retrieved from database 110. Further, as described above, "lifecycle data" may include any data associated with a vehicle component that indicates an amount of wear and/or use that the component may suitably receive prior to replacement or maintenance of the component. For example, in the case of tires, lifecycle data may include a mileage, a tread depth, and/or any other data indicative of the life expectancy (prior to replacement) of the tires.

Computer system 100 may, based upon the received vehicle telematics data (e.g., a determined rate of wear) and/or retrieved lifecycle data, determine a replacement cycle. Specifically, in some embodiments, computer system 100 may mathematically divide lifecycle data by a determined rate of wear. For example, in the case of vehicle tires, lifecycle data may indicate that the tires have a life expectancy of 45,000 miles. System 100 may divide the life expectancy of 45,000 miles (minus any mileage already placed on the tires) by an average mileage (received by the system as telematics data and/or calculated by computer system 100 based upon received telematics data) to determine a time remaining until replacement of the tires. Thus, in the case of a new set of tires (having little or no wear) and an average daily mileage of 50 miles/day, a replacement cycle (e.g., a time remaining until replacement) may be approximately 900 days (e.g., 45,000/50).

In the exemplary embodiment, computer system 100 may also determine a replacement cost and/or a maintenance cost of one or more vehicle components (step 406). For example, in some embodiments, computer system 100 may retrieve a replacement cost and/or a maintenance cost associated with one or more components from a database. As described above, a "replacement cost" may include any cost associated with replacing a worn or damaged vehicle component. Similarly, as described above, a "maintenance cost" may include any cost associated with maintenance performed on a worn or damaged vehicle component.

Computer system 100 may, in addition, calculate a plurality of periodic maintenance contributions to a maintenance savings account (step 408). As described above, a "periodic maintenance contribution" may include any periodic and/or recurring payment from one account (e.g., a "primary account") to another account (e.g., a "periodic maintenance account"), where a primary account may be any bank account from which funds may be transferred, and a periodic maintenance savings account may be any account designated to receive funds from the primary account, such as, for example, one or more periodic maintenance contributions.

Accordingly, to calculate a periodic maintenance contribution, computer system 100 may subtract a current maintenance account balance from a total replacement cost and/or a total maintenance cost of a vehicle component. System 100 may, in addition, divide the resulting mathematical difference by a replacement cycle (as described above). For example, computer system 100 may determine that a maintenance account includes a current balance of $200 as well as that a total cost of tire replacement is $500. System 100 may subtract $200 from $500 to determine that a maintenance savings account associated with vehicle 101 is $300 short of the balance required to replace the tires on vehicle 101. System 100 may, in addition, divide the balance required (e.g., $300) by the replacement cycle (e.g., in the example above, 900 days) to calculate a periodic (daily) maintenance contribution, such as, for example $0.33/day.

Thus, computer system 100 may divide a replacement cycle into a plurality of replacement intervals, and each replacement interval may be associated with a periodic maintenance contribution. For instance, in the example above, a replacement cycle may be divided into a plurality of daily replacement intervals, each associated with a periodic (e.g., daily) maintenance contribution. Computer system 100 may, in addition, divide a total (or remaining) replacement cost by a total number of (remaining) replacement intervals to obtain an amount associated with each of the plurality of periodic maintenance contributions. In other words, and in brief, computer system 100 may determine a periodic maintenance contribution based upon a total cost of replacing a vehicle component (less an existing or current maintenance account balance), and the resulting mathematical difference may be divided by a replacement cycle and/or a number of replacement intervals subdivided from the total replacement cycle. In addition, and in the exemplary embodiment, computer system 100 may automatically transfer one or more periodic maintenance contributions from a primary account to a periodic maintenance savings account (step 410).

In various embodiments, computer system 100 may also provide an interface (e.g., a "dashboard") from which a user may select one or more vehicle components for periodic maintenance contributions. The dashboard may be provided as a web-based interface, such as a smartphone "app" and/or as a webpage provided to any suitable computing device, such as a mobile device or client device 102. Thus, in some embodiments, a user may select vehicle components to which the user would like computer system 100 to allocate periodic maintenance contributions. Each vehicle component may be monitored independently by computer system 100, and a maintenance savings account may be organized or partitioned to track periodic maintenance contributions on a component-by-component basis. In other embodiments, each vehicle component may be associated with a unique maintenance savings account to ensure that funds allocated to a particular vehicle component are maintained in a dedicated maintenance savings account.

In certain embodiments, the dashboard further includes any number of account identifiers (e.g., account names, account numbers), such that the user may select a maintenance savings account to allocate funds to. In certain embodiments, the account identifiers may be associated with restricted accounts, such as accounts limited to withdraw by only a subset of vehicle users. For example, the dashboard may include an account identifier associated with an account allowing for deposits by any vehicle user, but withdraws only by the vehicle owner. In another example, the dashboard may include an account identifier associated with an account where withdraws are restricted to automotive merchants (e.g., vehicle dealerships, vehicle component suppliers, vehicle component manufacturers, automotive service providers). In one embodiment, the dashboard includes a list of account numbers and associated descriptions indicating the type of account (e.g., joint account, restricted account), such that the user may select an account based on the identifier. In certain embodiments, the computing system is configured to make allocations to a dedicated maintenance savings account based at least in part of the account identifier selection. For example, the allocation destination may be determined based on the selected account identifier from the dashboard.

In addition, in some embodiments, computer system 100 may determine, based upon updated vehicle telematics data, an updated replacement cycle associated with one or more vehicle components. For example, computer system 100 may periodically (e.g., daily) receive updated telematics data from vehicle 101. In response, computer system 100 may determine, based upon the updated telematics data, one or more updated replacement cycles associated with one or more vehicle components. Thus, in some embodiments, computer system 100 is capable of dynamically adjusting a replacement cycle (and thus a periodic maintenance contribution) based upon, for example, real-time (or near real-time) vehicle telematics data.

Moreover, in various embodiments, computer system 100 may also determine one or more maintenance contributions based upon one or more trip costs associated with vehicle 101. As used herein, a "trip cost" is a cost associated with a particular "trip" or use of vehicle 101. For example, computer system 100 may analyze vehicle telematics data to determine one or more trip costs associated with one or more vehicle components. Such trip costs may be based upon, for instance, wear on a vehicle component as a result of a particular trip or use of vehicle 101. To calculate a trip cost, computer system 100 may mathematically divide a life expectancy of a vehicle component by a value (derived or obtained directly from vehicle telematics data) indicating an amount of life expectancy used or consumed during a particular trip. The ratio obtained as a result of the division may be multiplied by the total replacement cost of the vehicle component to determine the trip cost associated with a trip.

System 100 may, in addition, aggregate a plurality of trip costs to obtain an aggregated trip cost. The aggregated trip cost may be compared by computer system 100 to a maintenance contribution threshold (which may be selected by a user and/or preselected by the system), and if the aggregated trip cost exceeds the maintenance contribution threshold, computer system 100 may automatically transfer a periodic maintenance contribution (such as a periodic maintenance contribution totaling the aggregated trip cost) from a primary account to a maintenance savings account.

In some embodiments, computer system 100 may be configured to allocate periodic maintenance contributions based upon a particular user, or user, of vehicle 101. For example, computer system 100 may identify a first user of a vehicle and a second user of the vehicle. To identify one or more users, computer system 100 may analyze received vehicle telematics data, which may include data sufficient to determine which of the users was driving vehicle 101 when the telematics data was generated. In other words, the received vehicle telematics data may specify a user associated with a particular use of vehicle 101.

Computer system 100 may, in addition, allocate a first plurality of maintenance contributions (or an individual maintenance contribution) to a first maintenance savings account associated with the first user based upon the vehicle telematics data. Similarly, computer system 100 may allocate a second plurality of maintenance contributions (or an individual maintenance contribution) to a second maintenance savings account associated with the second user based upon the vehicle telematics data. The maintenance contributions allocated to the first and second maintenance savings accounts may thus reflect actual usage of vehicle 101 by a plurality of users, such that each user is only responsible for deposits to a maintenance savings account as a result of that user's actual use of vehicle 101. When a vehicle component is due for replacement (or maintenance) the funds allocated to each of the plurality of maintenance savings accounts may be aggregated, by the system, to equal the total replacement (or maintenance) cost of the vehicle component.

In some embodiments, computer system 100 may store one or more groups of telematics data obtained over a period of time, such as daily groups of telematics data, in a plurality of blocks of a blockchain. As used herein, a "blockchain" is a distributed database that maintains a continuously-growing list of ordered records, known as blocks. Each block may contain at least a timestamp and a link to the previous block in the chain. The link to the previous block may be a hash of the previous block. For vehicle telematics data, the first block may contain vehicle telematics data received during a particular period of time, such as over the course of a particular day. The second block may contain an updated or later vehicle telematics data, such as vehicle telematics data received during a subsequent period of time, such as over the course of a subsequent day. The second block may contain a hashed copy of the first block as well. This blocking of vehicle telematics data may continue to any number of blocks, with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining FIG. 5 is a schematic diagram illustrating another exemplary computer-implemented process 500 for automatically allocating periodic maintenance contributions to a maintenance savings account based upon vehicle telematics data, as implemented by computer system 100 (shown at FIG. 1), and in accordance with various embodiments of the present disclosure. As described above, process 500 may be implemented independently and/or in conjunction with one or more other process(es) (described herein) for automatically allocating periodic maintenance contributions to a maintenance savings account based upon vehicle telematics data.

Process 500 includes step A, receiving telematics data from user vehicle 502, and step B, appending the received telematics data to the stored telematics data 504. Process 500 further includes processing stored telematics data 504 to update (e.g., estimate, calculate) trip model data 506 which may include a cost amount for a specific trip and end of life estimates for particular vehicle components. In other words, trip model data 506 may include estimates for each vehicle component being tracked, wherein the estimates include a cost associated with that component for a particular trip and an EUL (end of life) for each component indicating when the component may need to be replaced. Process 500 includes step D, calculating periodic maintenance contributions based on trip model data 506. Step D includes calculating periodic maintenance contributions based on factors 508 such as, but not limited to, total repair costs, current maintenance account balance, and time until estimated replacement. Process 500 further includes step E, allocating periodic maintenance contributions to a maintenance savings account.

Figure 6:
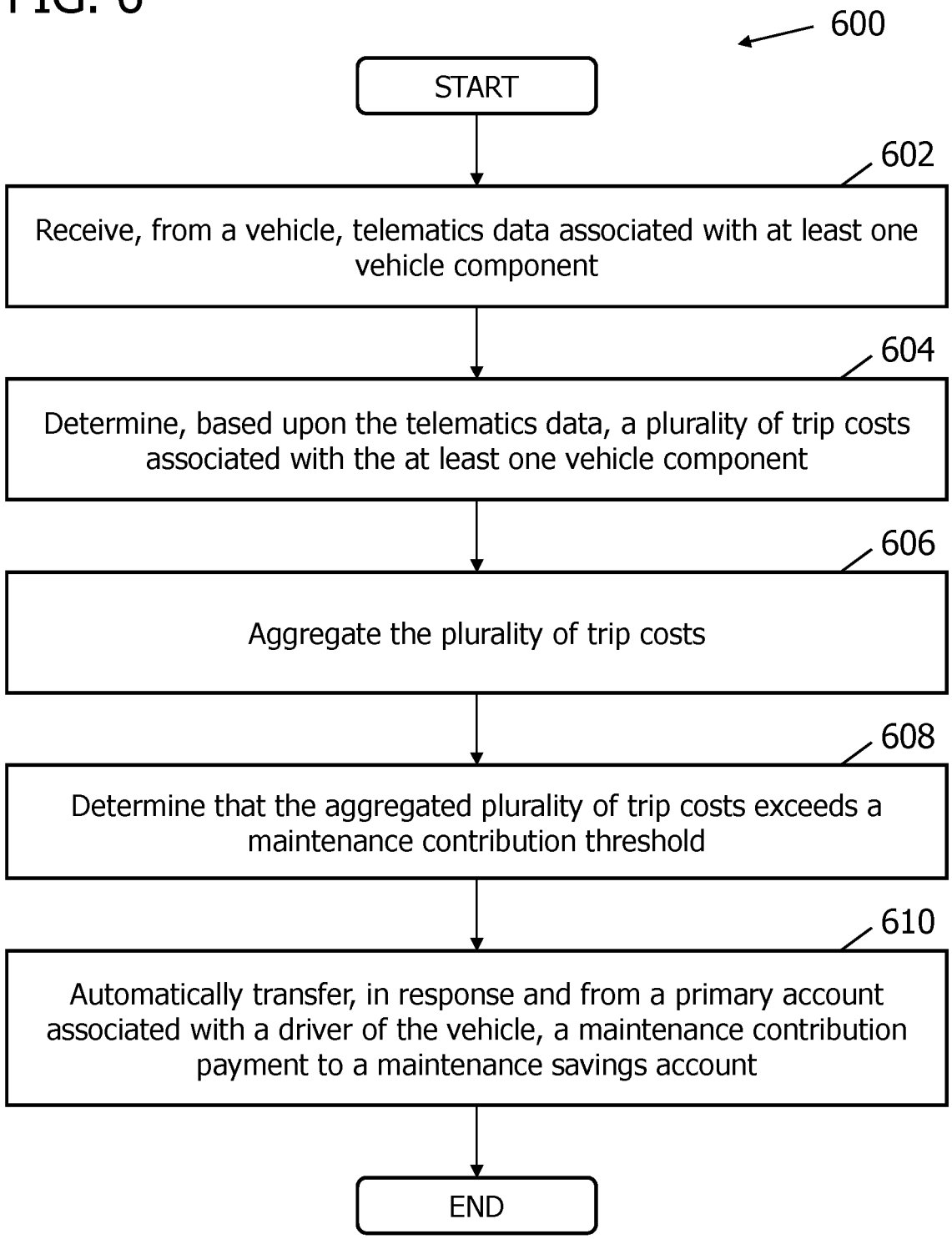
FIG. 6 is a flowchart illustrating another exemplary process for automatically allocating periodic maintenance contributions to a maintenance savings account based upon vehicle telematics data, as implemented by the system shown at FIG. 1, and in accordance with various embodiments of the present disclosure.

FIG. 6 is a schematic diagram illustrating another exemplary computer-implemented process 600 for automatically allocating periodic maintenance contributions to a maintenance savings account based upon vehicle telematics data, as implemented by computer system 100 (shown at FIG. 1), and in accordance with various embodiments of the present disclosure. As described above, process 600 may be implemented independently and/or in conjunction with one or more other process(es) (described herein) for automatically allocating periodic maintenance contributions to a maintenance savings account based upon vehicle telematics data.

Accordingly, in the exemplary embodiment, computer system 100 may receive vehicle telematics data associated with one or more vehicle components (step 602). System 100 may, in addition, determine, based upon the telematics data, a plurality of trip costs (described above) associated with at least one vehicle component (step 604). Having received the plurality of trip costs, computer system 100 may aggregate the plurality of trip costs to determine an aggregated trip cost (described above) (step 606), at which point computer system 100 may compare the aggregated trip cost to a maintenance contribution threshold to determine whether the aggregated trip cost exceeds a maintenance contribution threshold (described above) (step 608). Further, in some embodiments, system 100 may automatically transfer a maintenance contribution from a primary account to a maintenance savings account (described above) (step 610).

Figure 7:
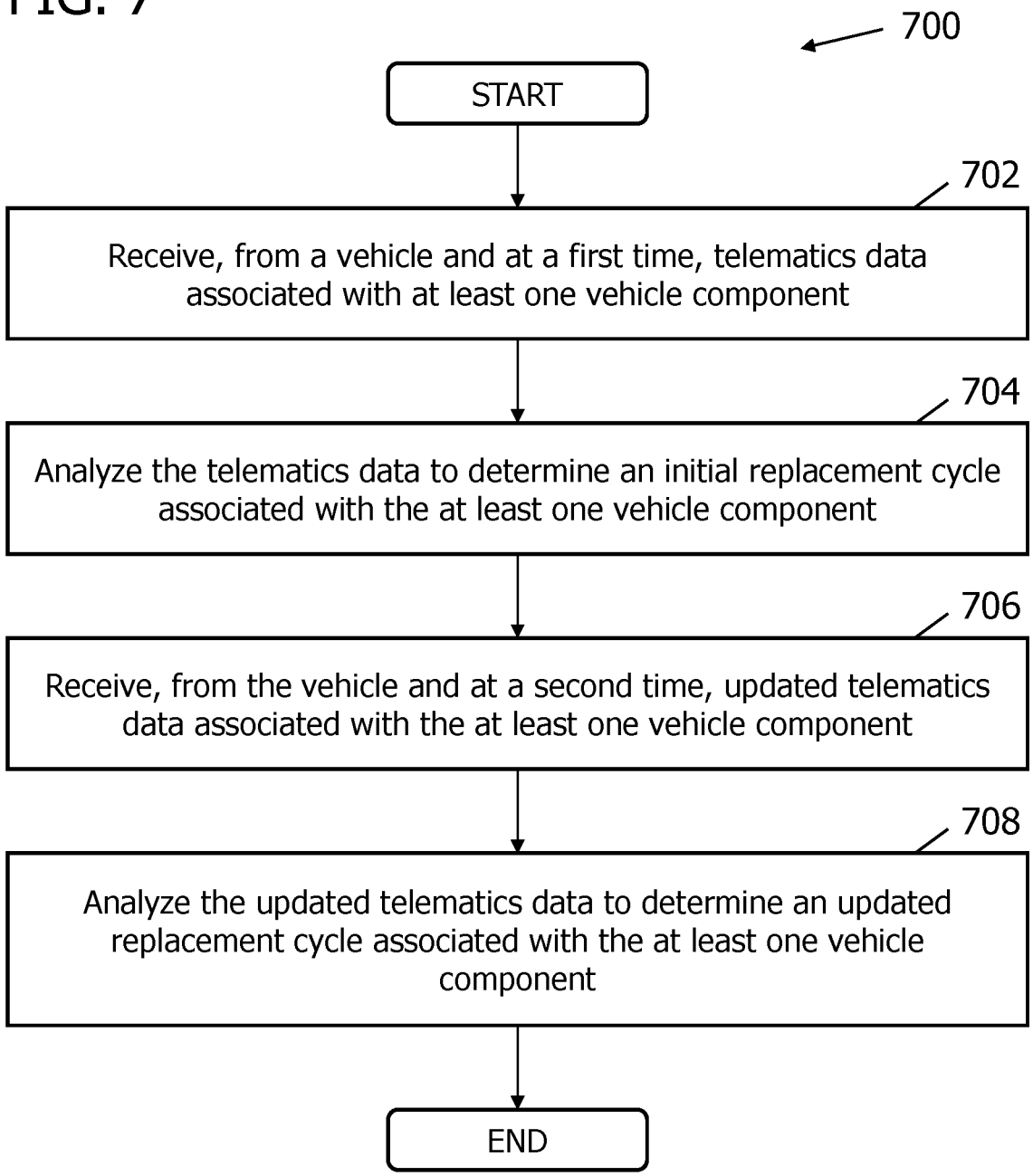
FIG. 7 is a flowchart illustrating another exemplary process for automatically allocating periodic maintenance contributions to a maintenance savings account based upon vehicle telematics data, as implemented by the system shown at FIG. 1, and in accordance with various embodiments of the present disclosure.

FIG. 7 is a schematic diagram illustrating another exemplary computer-implemented process 700 for automatically allocating periodic maintenance contributions to a maintenance savings account based upon vehicle telematics data, as implemented by computer system 100 (shown at FIG. 1), and in accordance with various embodiments of the present disclosure. As described above, process 700 may be implemented independently and/or in conjunction with one or more other process(es) (described herein) for automatically allocating periodic maintenance contributions to a maintenance savings account based upon vehicle telematics data.

Accordingly, in the exemplary embodiment, computer system 100 may receive, at a first time, vehicle telematics data associated with one or more vehicle components (step 702). System 100 may, in addition, analyze the vehicle telematics data to determine an initial replacement cycle associated with at least one vehicle component (described above) (step 704). Computer system 100 may also receive, at a second time, updated vehicle telematics data associated with the at least one vehicle component (described above) (step 706). In addition, and in various embodiments, system 100 may analyze the updated telematics data to determine an updated replacement cycle associated with the at least one vehicle component (described above) (step 708).

Figure 8:
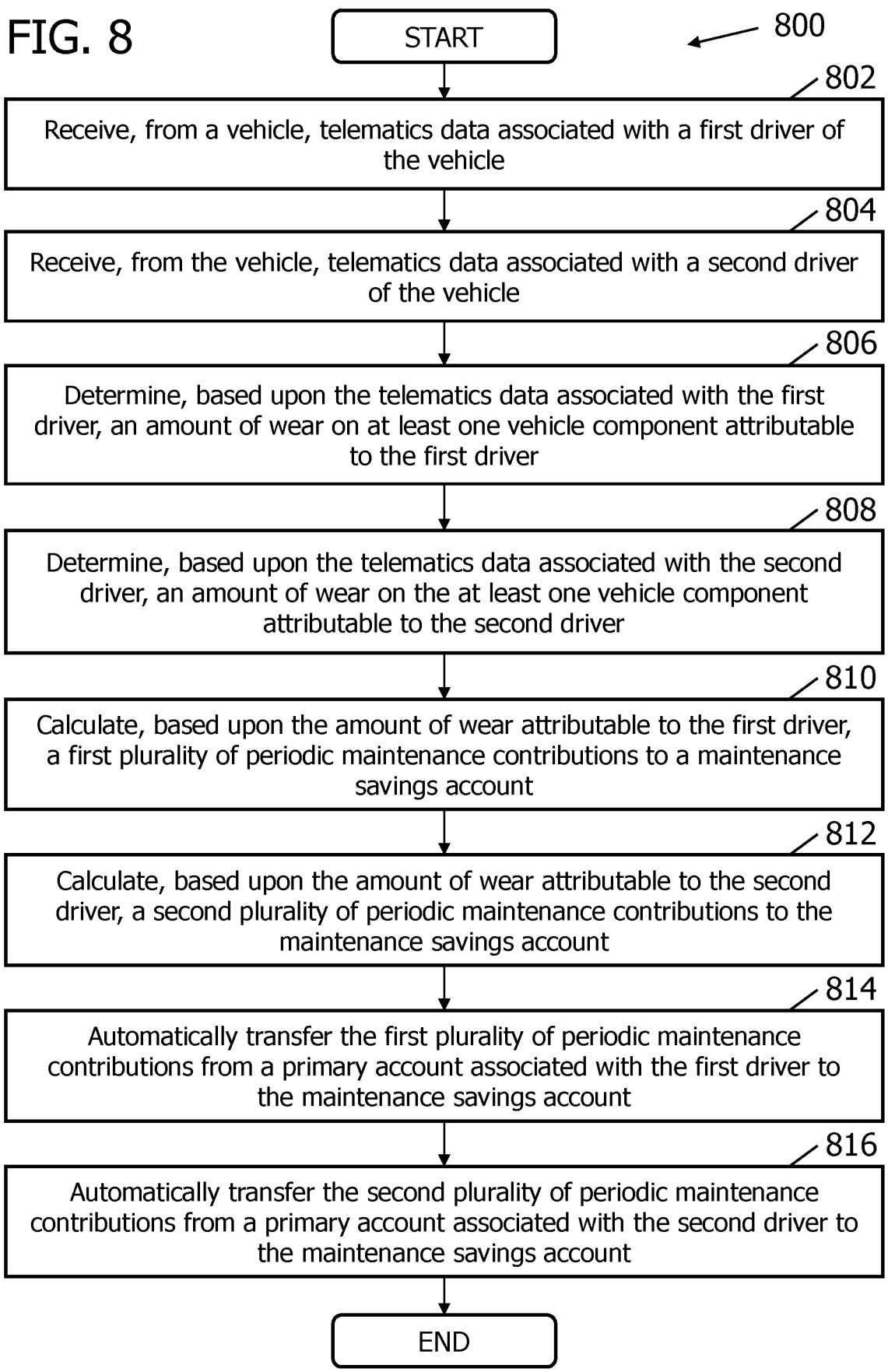
FIG. 8 is a flowchart illustrating another exemplary process for automatically allocating periodic maintenance contributions to a maintenance savings account based upon vehicle telematics data, as implemented by the system shown at FIG. 1, and in accordance with various embodiments of the present disclosure.

FIG. 8 is a schematic diagram illustrating another exemplary computer-implemented process 800 for automatically allocating periodic maintenance contributions to a maintenance savings account based upon vehicle telematics data, as implemented by computer system 100 (shown at FIG. 1), and in accordance with various embodiments of the present disclosure. As described above, process 800 may be implemented independently and/or in conjunction with one or more other process(es) (described herein) for automatically allocating periodic maintenance contributions to a maintenance savings account based upon vehicle telematics data.

Accordingly, in the exemplary embodiment, computer system 100 may receive vehicle telematics data associated with a first user of vehicle 101 (described above) (step 802). System 100 may also receive vehicle telematics data associated with a second user of vehicle 101 (described above) (step 804). Further, in various embodiments, computer system 100 may determine, based upon the telematics data associated with the first user, an amount of wear on at least one vehicle component attributable to the first user (described above) (step 806). Similarly, computer system 100 may determine, based upon the telematics data associated with the second user, an amount of wear on at least one vehicle component attributable to the second user (described above) (step 808).

In some embodiments, computer system 100 may, in addition, calculate, based upon the amount of wear attributable to the first user, a first plurality of periodic maintenance contributions to a maintenance savings account (described above) (step 810). Likewise, computer system 100 may calculate, based upon the amount of wear attributable to the second user, a second plurality of periodic maintenance contributions to a same or different maintenance savings account (described above) (step 812). System 100 may, in addition, automatically transfer the first plurality of periodic maintenance contributions from a primary account associated with the first user to a particular maintenance savings account (described above) (step 814). Similarly, in various embodiments, system 100 may automatically transfer the second plurality of periodic maintenance contributions from a primary account associated with the second user to a particular maintenance savings account (described above) (step 816).

Figure 9:
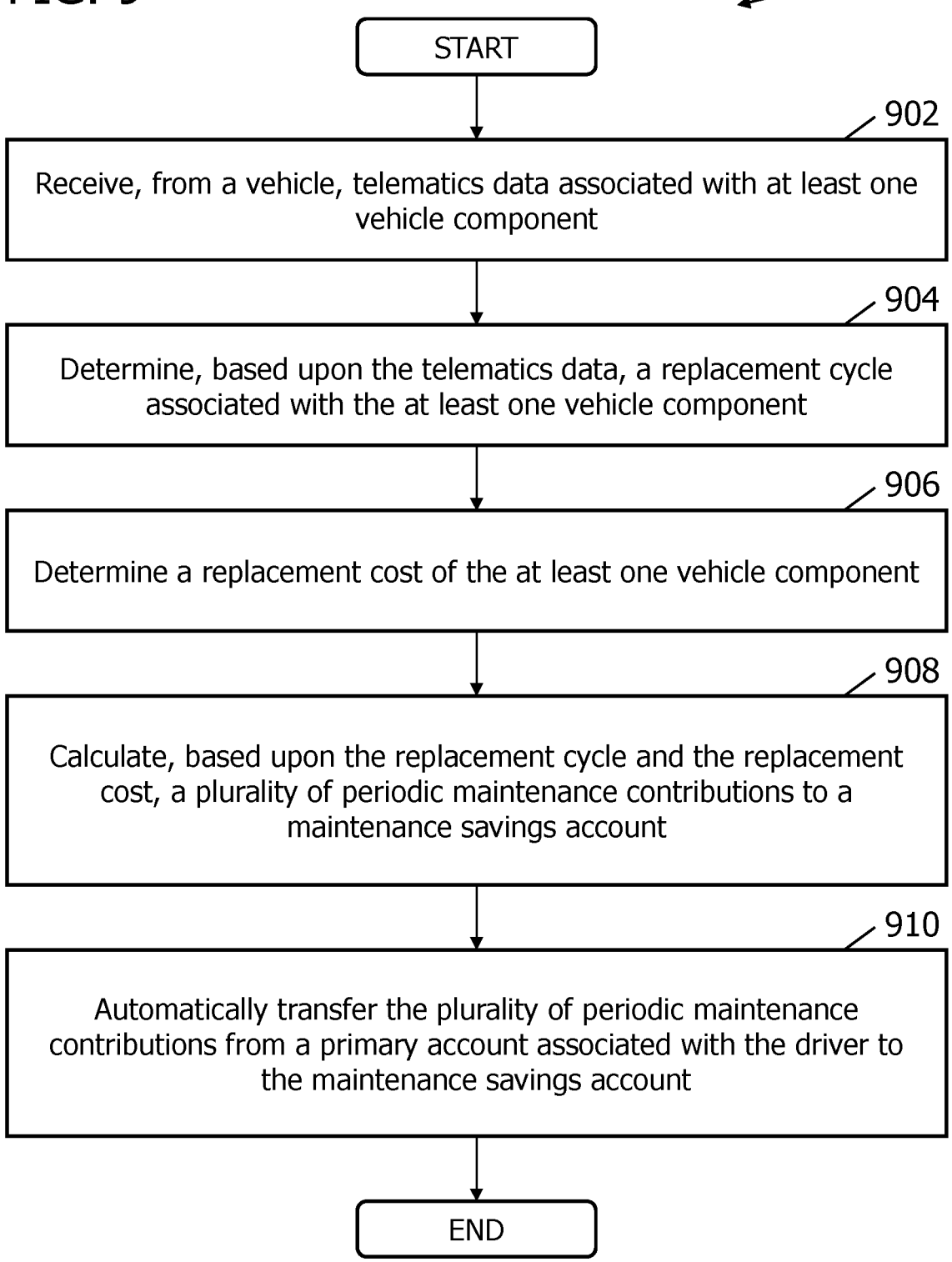
FIG. 9 is a flowchart illustrating another exemplary process for automatically allocating periodic maintenance contributions to a maintenance savings account based upon vehicle telematics data, as implemented by the system shown at FIG. 1, and in accordance with various embodiments of the present disclosure.

FIG. 9 is a schematic diagram illustrating another exemplary computer-implemented process 900 for automatically allocating periodic maintenance contributions to a maintenance savings account based upon vehicle telematics data, as implemented by computer system 100 (shown at FIG. 1), and in accordance with various embodiments of the present disclosure. As described above, process 900 may be implemented independently and/or in conjunction with one or more other process(es) (described herein) for automatically allocating periodic maintenance contributions to a maintenance savings account based upon vehicle telematics data.

Accordingly, in the exemplary embodiment, computer system 100 may receive vehicle telematics data associated with at least one vehicle component (described above) (step 902). System 100 may, in addition, determine, based upon the vehicle telematics data, a replacement cycle associated with the at least one vehicle component (described above) (step 904). Further, in some embodiments, computer system 100 may determine a replacement cost associated with the at least one vehicle component (described above) (step 906). System 100 may, in addition, calculate, based upon the replacement cycle and the replacement cost, a plurality of periodic maintenance contributions to a maintenance savings account (described above) (step 908). In addition, computer system 100 may automatically transfer the plurality of periodic maintenance contributions from a primary account associated with the user to the maintenance savings account (described above) (step 910).

Exemplary Data & Financial Flows

As noted elsewhere herein, the present embodiments may include (1) combining expansive vehicle data, such as vehicle telematics data, smart vehicle data, and/or autonomous vehicle data, with additional industry data; (2) using the combined data to predict vehicle component expiration dates or useful life longevity; (3) use of both operational (historical) data and calculated predictions to in turn calculate costs of vehicle operation at the component level; and/or (4) performing periodic transfer/deposits of small amounts of money in a reserved savings account dedicated to individual vehicle component replacement.

In one aspect, the present embodiments relate to the calculation of vehicle maintenance savings account deposits through vehicle telematics data. Vehicle operational and/or vehicle telematics data may be used to calculate periodic pre-funding of an automobile maintenance savings account for routinely or commonly expendable components.

For instance, in one scenario, hard braking to avoid a collision may lead to a shorter life span for a vehicle's brakes. However, brakes are expensive, and the expenditure may hit an average vehicle owner's wallet rather hard. The present embodiments may automatically budget for replacement brakes because average automobile owners don't often budget for vehicle repairs and may be unprepared to pay for repairs when the need arises (such as tires, brakes, coolant, transmission, brake fluid, brake fluid changes, power steering fluid, transmission fluid, batteries (such as L-ION batteries for hybrids or electric vehicles), sensors, etc.). Other embodiments may involve the repairs being associated with autonomous or semi-autonomous vehicle systems or technologies being maintained up-to-date or in working condition, such as maintaining autonomous vehicle system sensors or software in working order. Thus, the present embodiments may provide a means for regularly buffering money for inevitable vehicle repairs and replacement parts and servicing.

In one embodiment, vehicle telematics data may be used to calculate how much one should transfer to a bank savings account based on how they drive or how their vehicle is being driven by others (e.g., a vehicle fleet) or otherwise being operated (e.g., an autonomous vehicle). The present embodiments may determine approximate wear and tear on an on-going basis, take into account current parts and labor costs for repair/replacement based on the make and/or model of vehicle, and then automatically transfer appropriate amounts of money into a sub-account—which may be dedicated solely to vehicle maintenance.

Figure 10:
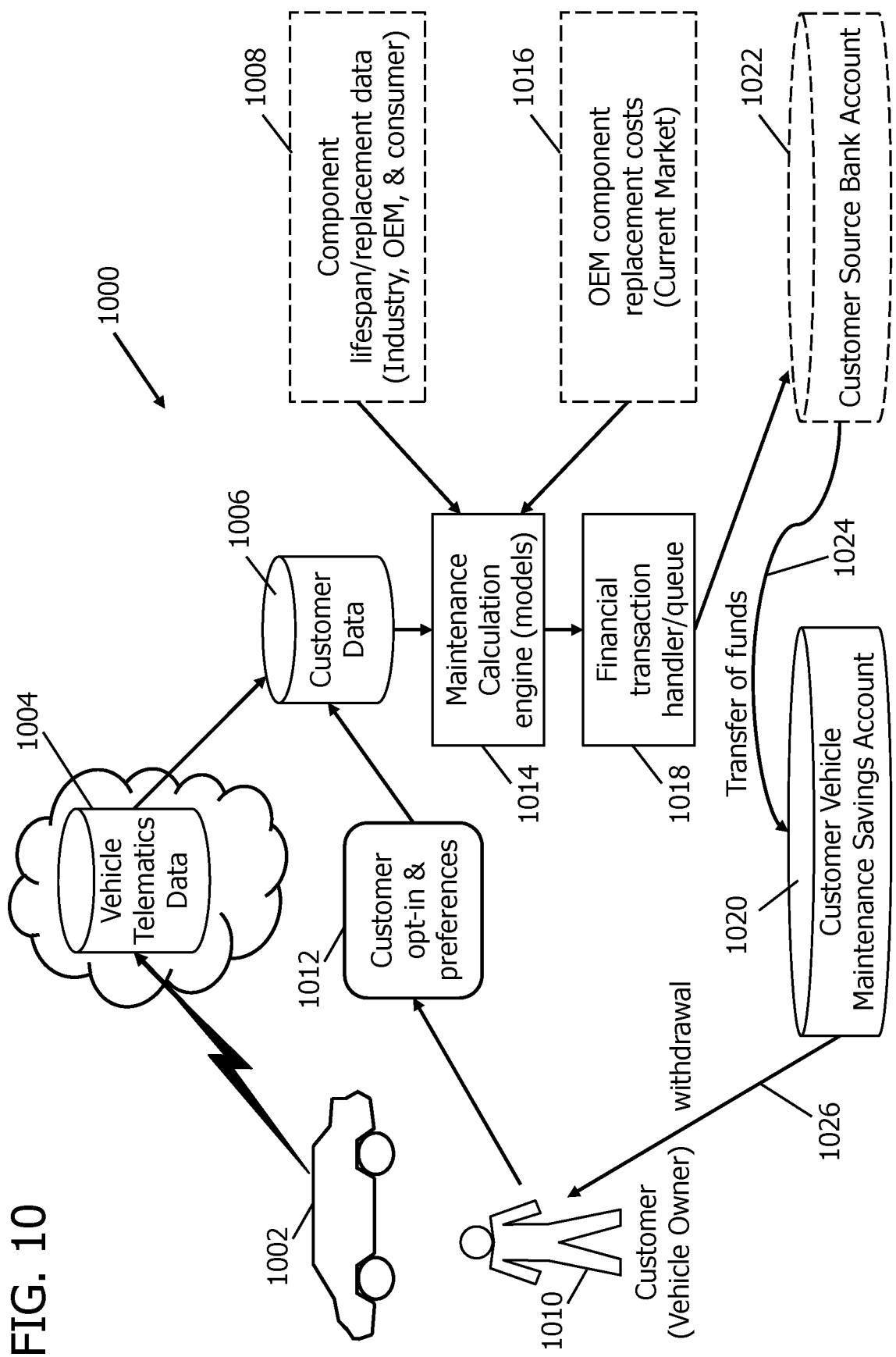
FIG. 10 depicts an exemplary vehicle telematics maintenance savings account data and financial flow, in accordance with various embodiments of the present disclosure.

FIG. 10 depicts an exemplary vehicle telematics maintenance savings account data and financial flow 1000. As shown, vehicle operation data (e.g., telematics data) from an enabled vehicle (such as a smart or autonomous vehicle equipped for wireless communication) is transmitted or otherwise transferred to a centralized data store, after which a specified subset of data may be transferred or copied to a repository for and merged with owner data. Based upon owner preferences and election, requisite owner and vehicle data may be fed into a maintenance calculation engine, which may be additionally informed by third-party data sources containing information on vehicle component lifespan, recommended replacement, and/or present estimated costs of replacement.

The maintenance calculation engine shown in FIG. 10 may predict the future repair date of expendable vehicle components based upon (i) how the individual vehicle has been driven or operated (if autonomous), (ii) aggregated vehicle operation and maintenance trends of the specific model vehicle, and/or (iii) the corresponding cost of operation for the individual vehicle over the last period of operation—all of which may translate to the amount of money needing to be saved to pre-fund costs of the wear to the vehicle components. This calculated amount may be buffered until it reaches a set threshold, upon which the buffered tally may be relayed to a financial transaction handler, which may queue a bank transfer from a source account to a dedicated savings account.

As the vehicle owner continues to drive or otherwise operate the vehicle and additional telematics data accrues, future replacement dates and costs may be refined, and the maintenance savings account accrues the funds sufficient to replace the worn components upon their expiration.

In one embodiment, a customer may open a vehicle savings account and opt into sharing vehicle telematics and personal data with an insurance provider. In return, the customer may receive insurance cost benefits and/or other benefits, such as the savings accounts discussed herein. The vehicle maintenance savings account may be linked to another account or service provided by an insurance provider, such as an auto-insurance telematics service or usage-based insurance (UBI) account. Through a control panel (web or pocket agent), the customer may configure the transfer period/threshold and choose which components to include in the maintenance savings (e.g., brakes and tires, but not fluids or sensors). The calculation engine may in turn show the customer the projected replacement dates, repair/replacement costs, and accrued funds saved to date (such as for both total funds and/or per component, and the remaining difference needed for fully funding the repair or replacement).

In one aspect, vehicle and environmental data may be used to predict the future repair date of the expendable components based upon how the vehicle is operated. The projected repair dates (in the future) may be always fluctuating, and hence may be constantly recalculated based upon historical driving data. The period over which the estimated repair/replacement costs must be divided may also be slightly changing, but is assumed to be growing shorter as the vehicle is driven. As such, small amounts of money may be transferred to the vehicle maintenance savings account periodically. Transfer of funds could occur after each trip or at other regular intervals (e.g., every one, two, or four weeks, to coincide with paychecks, etc.). Since the amounts of "maintenance money" may be miniscule on a trip by trip basis, there could be a minimum threshold which would have to be accrued before a transfer of money would be made. For example, a single trip might, according to operational data, generate the need to set aside $0.001 for tires and $0.0006 for brakes, but together those don't add up to a single cent. As such, the application managing the data and making the calculations may be configured to "buffer" amounts until they exceed a minimum threshold, after which the transfer of funds would be scheduled.

Figure 11:
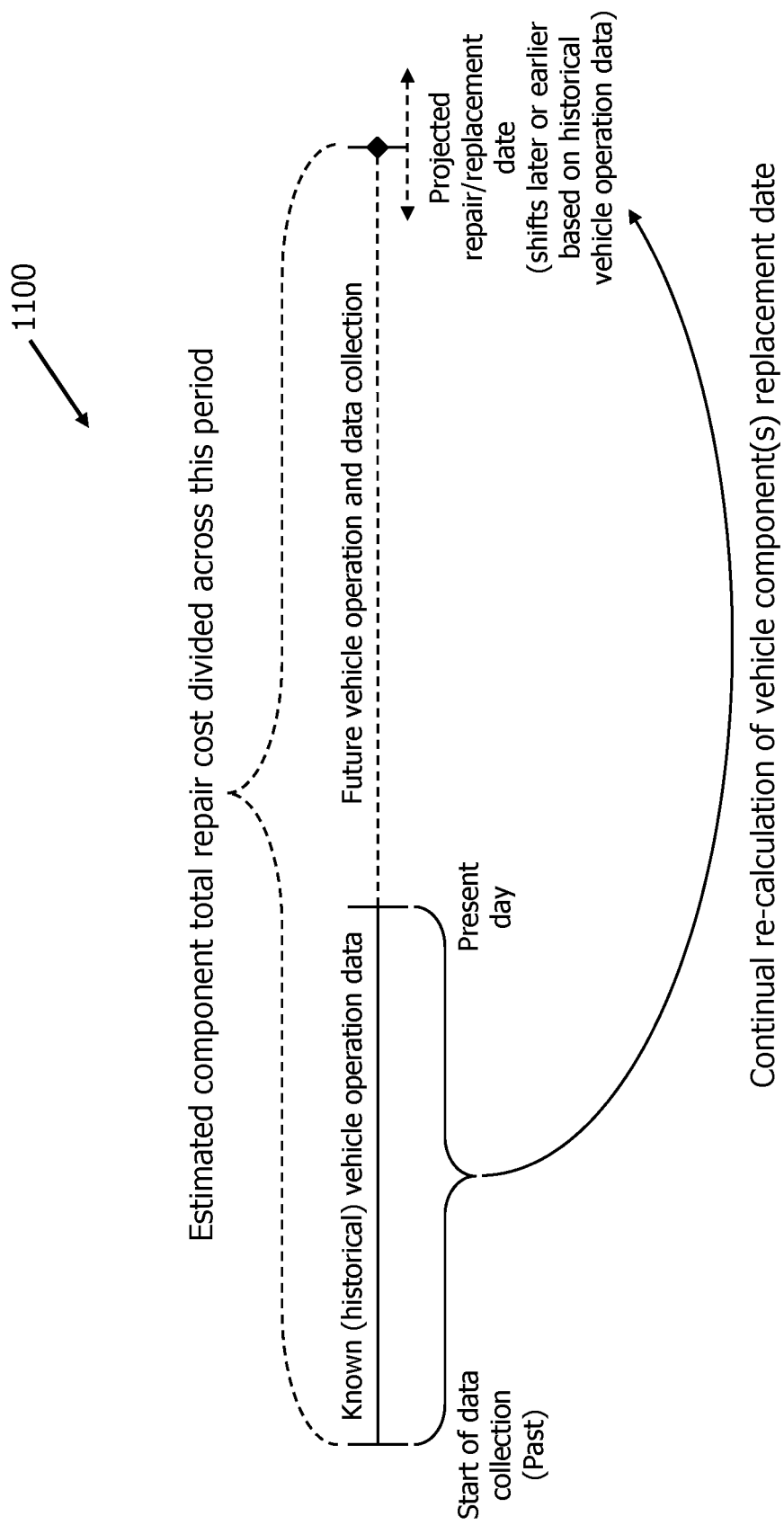
FIG. 11 depicts an exemplary conceptual timeline of data collections and calculations, in accordance with various embodiments of the present disclosure.

FIG. 11 depicts an exemplary conceptual timeline of data collections and calculations 1100. As shown, the estimated component total repair cost may be divided across two periods—known or historical telematics data, and future telematics data. The historical base data may include (i) make, model, year, and mileage of vehicle; (ii) recommended manufacturer routine vehicle maintenance mileages and periods; (iii) geographic location of the owner (or the usual geographic operating location for the vehicle); (iv) historical cost of ownership data for that make/model/year vehicle (if available from industry sources); and/or (v) historical repair time/cost data for same type vehicle, if available.

The dynamic (present day and/or future) data included in the algorithms may include (a) vehicle telematics and operational environment (sensor) data, including: braking, acceleration, cornering, speed sustained over mileage, ambient temperature, tire pressure, and tire temperature (if available); (b) geographic factors during operation: altitude and climate, including temperature, moisture, and environmental driving conditions (e.g., dusty, salty); and/or (c) current average labor and part costs, given the geographic market in which the customer resides.

In one embodiment, the present embodiments may either be focused on the routine and lower cost scheduled maintenance (oil changes, windshield wiper fluid, and tire rotations), and/or on the less routine and more expensive expendable components. The present embodiments may also be extended for more routine scheduled maintenance and partnerships leveraged to create additional benefits of association.

Additionally, the present embodiments may be extended from single owner scenarios to calculate total maintenance expenses for a dual-ownership (shared) vehicle, where the debits from source bank accounts (belonging to the users) correspond to the percentage of vehicle operation each user has undertaken. The deposit account (destination) may still be a singular account, likely in control of a single owner ultimately responsible for the maintenance of the vehicle. The advantage here is that shared vehicle operation costs may be automatically divided across all vehicle operators.

Exemplary Embodiments & Functionality

In one aspect, a computer system for automatically allocating periodic maintenance contributions to a maintenance savings account based upon vehicle telematics data may be provided. In some exemplary embodiments, the computer system may include a processor and a non-transitory, tangible, computer-readable storage medium having instructions stored thereon that, in response to execution by the processor, cause the processor to perform operations including: (i) receiving, from a vehicle, telematics data associated with at least one vehicle component; (ii) determining, based upon the telematics data, a replacement cycle associated with the at least one vehicle component; (iii) determining a replacement cost of the at least one vehicle component; (iv) calculating, based upon the replacement cycle and the replacement cost, a plurality of periodic maintenance contributions to a maintenance savings account, the maintenance savings account associated with the vehicle owner and designated to receive the plurality of periodic maintenance contributions; and/or (v) automatically transferring the plurality of periodic maintenance contributions from a primary account associated with the user to the maintenance savings account, each periodic maintenance contribution of the plurality of periodic maintenance contributions transferred to the maintenance savings account on a periodic basis over a period of time associated with the replacement cycle. The system may include additional, less, or alternate functionality, including that discussed elsewhere herein.

In another aspect, a computer system for automatically allocating periodic maintenance contributions to a maintenance savings account based upon vehicle telematics data may be provided. In some exemplary embodiments, the computer system may include a processor and a non-transitory, tangible, computer-readable storage medium having instructions stored thereon that, in response to execution by the processor, cause the processor to perform operations including: (i) receiving, from a vehicle, telematics data associated with at least one vehicle component; (ii) determining, based upon the telematics data, a plurality of trip costs associated with the at least one vehicle component, each of the plurality of trip costs representative of a cost associated with wear of the at least one vehicle component as a result of a particular vehicle trip; (iii) aggregating the plurality of trip costs; (iv) determining that the aggregated plurality of trip costs exceeds a maintenance contribution threshold; and/or (v) automatically transferring, in response and from a primary account associated with a user of the vehicle, a maintenance contribution payment to a maintenance savings account, the maintenance savings account designated to hold funds for replacing the at least one vehicle component at an end of a replacement cycle associated with the at least one vehicle component. The system may include additional, less, or alternate functionality, including that discussed elsewhere herein.

In another aspect, a computer system for automatically allocating periodic maintenance contributions to a maintenance savings account based upon vehicle telematics data may be provided. In some exemplary embodiments, the computer system may include a processor and a non-transitory, tangible, computer-readable storage medium having instructions stored thereon that, in response to execution by the processor, cause the processor to perform operations including: (i) receiving, from a vehicle and at a first time, telematics data associated with at least one vehicle component; (ii) analyzing the telematics data to determine an initial replacement cycle associated with the at least one vehicle component, the initial replacement cycle representative of an estimated lifecycle of the at least one vehicle component; (iii) receiving, from the vehicle and at a second time, updated telematics data associated with the at least one vehicle component; and/or (iv) analyzing the updated telematics data to determine an updated replacement cycle associated with the at least one vehicle component, the updated replacement cycle representative of an updated estimate of the lifecycle of the at least one vehicle component. The system may include additional, less, or alternate functionality, including that discussed elsewhere herein.

Analyzing the telematics data to determine the initial replace cycle may further include analyzing the telematics data associated with the at least one vehicle component to determine a rate of wear of the at least one vehicle component, and determining, based upon the rate of wear, a time remaining until replacement of the at least one vehicle component. The processor may be further configured to configured to perform operations including calculating, based upon the initial replacement cycle and a replacement cost, a plurality of periodic maintenance contributions to a maintenance savings account. The calculating may include dividing the initial replacement cycle into a plurality of replacement intervals, each replacement interval associated with one of the plurality of periodic maintenance contributions, and dividing the replacement cost by a total number of replacement intervals to obtain an amount associated with each of the plurality of periodic maintenance contributions.

The processor may also be configured provide a maintenance dashboard to a display of a client device associated with the user. The dashboard may including any combination or subset of: an option to select a plurality of vehicle components to which periodic maintenance contributions should be allocated, an option to select an account identifier from a plurality of account identifiers and account descriptions, an estimated replacement date of the plurality of vehicle components, an estimated replacement cost associated with the plurality of vehicle components, a total amount allocated to each of the plurality of vehicle components based upon a plurality of periodic maintenance contributions applied to each of the plurality of vehicle components, and a difference between the total amount allocated to each of the plurality of vehicle components and a replacement cost associated with each of the plurality of vehicle components.

The processor may be configured to perform operations including receiving, from a client device of the user, a plurality of vehicle components to which periodic maintenance contributions should be allocated, and/or recalculating, based upon the updated replacement cycle and the replacement cost, an updated plurality of periodic maintenance contributions.

In certain embodiments, the processor may be further configured to perform operations including determining, based upon the telematics data, a plurality of trip costs associated with the at least one vehicle component, aggregating the plurality of trip costs, determining that a total associated with the aggregated plurality of trip costs exceeds a maintenance contribution threshold, and automatically transferring, in response, one of the plurality of periodic maintenance payments to the maintenance savings account. Additionally or alternatively, the operations may include identifying a first user of the vehicle and a second user of the vehicle, allocating a first plurality of maintenance contributions to the first user based upon the telematics data; allocating a second plurality of maintenance contributions to the second user based upon the telematics data. The operations may also include storing a plurality of groups of telematics data obtained over a period of time in a plurality of blocks of a blockchain.

In another aspect, a computer system for automatically allocating periodic maintenance contributions to a maintenance savings account based upon vehicle telematics data may be provided. In some exemplary embodiments, the computer system may include a processor and a non-transitory, tangible, computer-readable storage medium having instructions stored thereon that, in response to execution by the processor, cause the processor to perform operations including: (i) receiving, from a vehicle, telematics data associated with a first user of the vehicle; (ii) receiving, from the vehicle, telematics data associated with a second user of the vehicle; (iii) determining, based upon the telematics data associated with the first user, an amount of wear on at least one vehicle component attributable to the first user; (iv) determining, based upon the telematics data associated with the second user, an amount of wear on the at least one vehicle component attributable to the second user; (v) calculating, based upon the amount of wear attributable to the first user, a first plurality of periodic maintenance contributions to a maintenance savings account; (vi) calculating, based upon the amount of wear attributable to the second user, a second plurality of periodic maintenance contributions to the maintenance savings account; (vii) automatically transferring the first plurality of periodic maintenance contributions from a primary account associated with the first user to the maintenance savings account; and/or (viii) automatically transferring the second plurality of periodic maintenance contributions from a primary account associated with the second user to the maintenance savings account. The system may include additional, less, or alternate functionality, including that discussed elsewhere herein.

The processor may be further configured to perform operations including determining, based upon the telematics data, a replacement cycle associated with at least one vehicle component. The determining may include analyzing the telematics data associated with the at least one vehicle component to determine a rate of wear of the at least one vehicle component, and determining, based upon the rate of wear, a time remaining until replacement of the at least one vehicle component. Calculating the first plurality of periodic maintenance contributions may include dividing the replacement cycle into a plurality of replacement intervals, each replacement interval associated with one of the first plurality of periodic maintenance contributions, and dividing the replacement cost by a total number of replacement intervals to obtain an amount associated with each of the first plurality of periodic maintenance contributions.

The processor may be configured to perform operations including providing providing a maintenance dashboard to a display of a client device associated with at least one of the first user and the second user. The maintenance dashboard may include any combination or subset of: an option to select a plurality of vehicle components to which periodic maintenance contributions should be allocated, an estimated replacement date of the plurality of vehicle components, an estimated replacement cost associated with the plurality of vehicle components, a total amount allocated to each of the plurality of vehicle components based upon a plurality of periodic maintenance contributions applied to each of the plurality of vehicle components; and a difference between the total amount allocated to each of the plurality of vehicle components and a replacement cost associated with each of the plurality of vehicle components.

The operations may further include receiving, from a client device of at least one of the first user and the second user, plurality of vehicle components to which periodic maintenance contributions should be allocated, and/or determining, based upon updated telematics data, an updated replacement cycle associated with the at least one vehicle component. In certain embodiments, the operations may also include recalculating, based upon the updated replacement cycle and the replacement cost, an updated plurality of periodic maintenance contributions and/or storing a plurality of groups of telematics data obtained over a period of time in a plurality of blocks of a blockchain.

In certain embodiments, the processor is further configured to perform operations including determining, based upon the telematics data, a plurality of trip costs associated with the at least one vehicle component, aggregating the plurality of trip costs, determining that a total associated with the aggregated plurality of trip costs exceeds a maintenance contribution threshold, and/or automatically transferring, in response, one of the plurality of periodic maintenance payments to the maintenance savings account.

In another aspect, a computer-implemented method for automatically allocating periodic maintenance contributions to a maintenance savings account based upon vehicle telematics data is provided may be provided. The method may include: (i) receiving, from a vehicle, telematics data associated with at least one vehicle component; (ii) determining, based upon the telematics data, a replacement cycle associated with the at least one vehicle component; (iii) determining a replacement cost of the at least one vehicle component; (iv) calculating, based upon the replacement cycle and the replacement cost, a plurality of periodic maintenance contributions to a maintenance savings account, the maintenance savings account associated with the vehicle owner and designated to receive the plurality of periodic maintenance contributions; and/or (v) automatically transferring the plurality of periodic maintenance contributions from a primary account associated with the user to the maintenance savings account, each periodic maintenance contribution of the plurality of periodic maintenance contributions transferred to the maintenance savings account on a periodic basis over a period of time associated with the replacement cycle. The system may include additional, less, or alternate functionality, including that discussed elsewhere herein.

In certain embodiments, the method further includes analyzing, by the processor, the telematics data associated with the at least one vehicle component to determine a rate of wear of the at least one vehicle component, and/or determining, by the processor and based upon the rate of wear, a time remaining until replacement of the at least one vehicle component. Additionally or alternatively, the method may include dividing, by the processor, the replacement cycle into a plurality of replacement intervals, each replacement interval associated with one of the plurality of periodic maintenance contributions, and/or dividing, by the processor, the replacement cost by a total number of replacement intervals to obtain an amount associated with each of the plurality of periodic maintenance contributions.

In some embodiments, the method includes providing, by the processor, a maintenance dashboard to a display of a client device associated with the user. The maintenance dashboard may include any combination or subset of an option to select a plurality of vehicle components to which periodic maintenance contributions should be allocated, an option to select an account identifier from a plurality of account identifiers and account descriptions, an estimated replacement date of the plurality of vehicle components, an estimated replacement cost associated with the plurality of vehicle components, a total amount allocated to each of the plurality of vehicle components based upon a plurality of periodic maintenance contributions applied to each of the plurality of vehicle components, and/or a difference between the total amount allocated to each of the plurality of vehicle components and a replacement cost associated with each of the plurality of vehicle components. The method may also include receiving, from a client device of the user, a plurality of vehicle components to which periodic maintenance contributions should be allocated and/or determining, by the processor and based upon updated telematics data, an updated replacement cycle associated with the at least one vehicle component. In some embodiments, the method includes comprising recalculating, by the processor and based upon the updated replacement cycle and the replacement cost, an updated plurality of periodic maintenance contributions.

In certain embodiments, the method further includes determining, by the processor and based upon the telematics data, a plurality of trip costs associated with the at least one vehicle component, aggregating, by the processor, the plurality of trip costs, determining, by the processor, that a total associated with the aggregated plurality of trip costs exceeds a maintenance contribution threshold, and/or automatically transferring, by the processor and in response, one of the plurality of periodic maintenance payments to the maintenance savings account. Additionally or alternatively, the method may include identifying, by the processor, a first user of the vehicle and a second user of the vehicle, allocating, by the processor, a first plurality of maintenance contributions to the first user based upon the telematics data, and/or allocating, by the processor, a second plurality of maintenance contributions to the second user based upon the telematics data. In some embodiments, the method also includes storing, by the processor, a plurality of groups of telematics data obtained over a period of time in a plurality of blocks of a block chain.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. In one embodiment, the system includes a plurality of virtual computing devices (e.g., virtual machines) in a cloud configuration, such that the virtual computing devices may be dynamically allocated. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for maintaining a vehicle with telematics data associated with the vehicle, the system comprising:

a server computing device comprising a processor in communication with a vehicle computing device of the vehicle, a maintenance account computing device, and a maintenance data source that includes cost data for vehicle components; and a non-transitory, tangible, computer-readable storage medium having instructions stored thereon that, in response to execution by the processor, cause the processor to perform operations comprising:

displaying, on a client device of a user, a dashboard including a plurality of vehicle components of the vehicle and one or more maintenance accounts associated with the user;

receiving, via a selector displayed on the dashboard, a plurality of selections, each selection associated with one of the plurality of vehicle components, the plurality of selections made to monitor a rate of wear of the associated vehicle component, each selection inputted by the user and indicating a maintenance account of the one or more maintenance accounts designated to hold funds for replacing each selected vehicle component at an end of a replacement cycle associated with each selected vehicle component, the maintenance account including a plurality of partitions, each partition designated to track one or more maintenance contributions for replacing each selected vehicle component;

receiving in real-time, via wireless communication from the vehicle computing device, the telematics data collected during a vehicle trip by one or more sensors associated with the vehicle, the one or more sensors configured to detect a condition of the plurality of vehicle components, the telematics data including a condition of each selected vehicle component and environmental data including environmental factors impacting the vehicle;

determining, based upon the condition of each selected vehicle component and the environmental data, the rate of wear of each selected vehicle component, thereby monitoring the rate of wear of each selected vehicle component;

determining, based upon the rate of wear of each selected vehicle component, a trip cost for the vehicle trip, the trip cost representative of a cost aggregation of the rate of wear of each selected vehicle component as a result of the vehicle trip;

retrieving, from the maintenance data source, lifecycle data of each selected vehicle component, the lifecycle data indicative of an amount of usage each selected vehicle component is designated to receive prior to replacement;

determining, based upon an analysis of the rate of wear and the lifecycle data of each selected vehicle component, the replacement cycle associated with each selected vehicle component;

aggregating the trip cost to a plurality of trip costs associated with each selected vehicle component;

determining, based upon the aggregated trip cost to the plurality of trip costs, that a total cost of trips associated with each selected vehicle component exceeds a maintenance contribution threshold; and automatically transmitting a message to the maintenance account computing device associated with a primary account of the user of the vehicle, the message including the total cost of trips and instructing the maintenance account computing device to automatically transfer a maintenance contribution payment representing the total cost of trips from the primary account to the maintenance account, the maintenance account allocating each portion of the total cost of trips to each partition associated with a corresponding selected vehicle component.

2. The computer system of claim 1, wherein the processor is further configured to perform operations comprising (a) determining, based upon the telematics data, the replacement cycle associated with each selected vehicle component and a replacement cost associated with each selected vehicle component, and (b) determining the replacement cost by querying the maintenance data source, and wherein determining the replacement cycle and the replacement cost further comprises:
 retrieving industry data associated with the telematics data, the industry data including vehicle labor rates associated with replacement of each selected vehicle component;
 analyzing the telematics data and the vehicle labor rates associated with the replacement of each selected vehicle component to determine the replacement cost; and
 determining, based upon the replacement cost, the total cost of trips.

3. The computer system of claim 2, wherein the processor is further configured to perform operations comprising calculating, based upon the replacement cycle and the replacement cost, a plurality of periodic maintenance contributions to the maintenance account, wherein calculating the plurality of periodic maintenance contributions further comprises:
 dividing the replacement cycle into a plurality of replacement intervals, each of the plurality of replacement intervals associated with one of the plurality of periodic maintenance contributions; and
 dividing the replacement cost by a total number of replacement intervals to obtain an amount associated with each of the plurality of periodic maintenance contributions.

4. The computer system of claim 1, wherein the processor is further configured to perform operations comprising providing the dashboard to a user interface of the client device.

5. The computer system of claim 1, wherein the processor is further configured to perform operations comprising causing to be displayed at least one of the following on the dashboard:
 an option to select each of the plurality of vehicle components to which periodic maintenance contributions should be allocated;
 an estimated replacement date of each of the plurality of vehicle components;
 an estimated replacement cost associated with each of the plurality of vehicle components;
 a total amount allocated to each of the plurality of vehicle components based upon a plurality of periodic maintenance contributions applied to each of the plurality of vehicle components; and
 a difference between the total amount allocated to each of the plurality of vehicle components and a replacement cost associated with each of the plurality of vehicle components.

6. The computer system of claim 1, wherein the maintenance account is partitioned to monitor independently the one or more maintenance contributions associated with each selected vehicle component, thereby enabling independent withdrawal of the one or more maintenance contributions for each selected vehicle component.

7. The computer system of claim 1, wherein the processor is further configured to perform operations comprising determining, based upon updated telematics data, an updated replacement cycle associated with each selected vehicle component.

8. The computer system of claim 7, wherein the processor is further configured to perform operations comprising recalculating, based upon the updated replacement cycle and a replacement cost, an updated plurality of periodic maintenance contributions.

9. The computer system of claim 1, wherein the processor is further configured to perform operations comprising:
 automatically identifying, based upon the telematics data, a first user of the vehicle and a second user of the vehicle, the telematics data including data identifying one of the first user and the second user as a driver of the vehicle;
 allocating a first plurality of maintenance contributions to the first user based upon the telematics data and whether the first user is identified as the driver of the vehicle; and
 allocating a second plurality of maintenance contributions to the second user based upon the telematics data and whether the second user is identified as the driver of the vehicle.

10. The computer system of claim 1, wherein the processor is further configured to perform operations comprising storing a plurality of groups of telematics data obtained over a period of time in a plurality of blocks of a blockchain.

\* \* \* \* \*